(12) United States Patent
Umezu

(10) Patent No.: US 9,247,153 B2
(45) Date of Patent: Jan. 26, 2016

(54) IMAGE PROCESSING APPARATUS, METHOD AND IMAGING APPARATUS

(71) Applicant: FUJITSU SEMICONDUCTOR LIMITED, Yokohama, Kanagawa (JP)

(72) Inventor: Yuji Umezu, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 157 days.

(21) Appl. No.: 14/079,297

(22) Filed: Nov. 13, 2013

(65) Prior Publication Data

US 2014/0205193 A1 Jul. 24, 2014

(30) Foreign Application Priority Data

Jan. 24, 2013 (JP) ................................. 2013-011482

(51) Int. Cl.
*G06K 9/00* (2006.01)
*H04N 5/235* (2006.01)
*H04N 5/232* (2006.01)

(52) U.S. Cl.
CPC .......... *H04N 5/2355* (2013.01); *H04N 5/23264* (2013.01)

(58) Field of Classification Search
CPC ............ H04N 5/23265; H04N 5/2355; H04N 5/2353; H04N 5/357; H04N 5/2351
USPC ............... 348/229.1, E05.037, 234, 251, 311, 348/362, 239, E09.053, 222.1; 382/169
See application file for complete search history.

(56) References Cited

U.S. PATENT DOCUMENTS

| | | | |
|---|---|---|---|
| 8,421,740 B2 * | 4/2013 | Watanuki | G09G 3/3426 345/102 |
| 2008/0036882 A1 * | 2/2008 | Uemura | H04N 5/23212 348/241 |
| 2009/0002529 A1 * | 1/2009 | Shurboff | H04N 5/23232 348/251 |
| 2010/0097493 A1 * | 4/2010 | Asoma | H04N 5/235 348/229.1 |
| 2010/0182444 A1 * | 7/2010 | Kroepfl | H04N 5/2351 348/222.1 |
| 2010/0277634 A1 * | 11/2010 | Watanabe | H04N 5/23212 348/311 |
| 2015/0015740 A1 * | 1/2015 | Cho | H04N 5/2355 348/234 |
| 2015/0042836 A1 * | 2/2015 | Lin et al. | H04N 5/2353 348/222.1 |

FOREIGN PATENT DOCUMENTS

| | | |
|---|---|---|
| JP | 2006-050494 A | 2/2006 |
| JP | WO 2009/050594 A2 | 4/2009 |
| JP | 2009-213032 A | 9/2009 |
| JP | 2011-503915 A | 1/2011 |

* cited by examiner

*Primary Examiner* — Mekonen Bekele
(74) *Attorney, Agent, or Firm* — Arent Fox LLP

(57) ABSTRACT

An image processing apparatus includes a histogram computation section that for a plurality of images with different light exposure amounts captured, computes for each of the images a histogram of the number of pixels a light exposure amount ratio computation section that, based on a degree of similarity between a profile of a first histogram computed from a first image out of the plurality of images and a profile of a second histogram computed from a second image out of the plurality of images, computes as a light exposure amount ratio a ratio between a light exposure amount for the first image and a light exposure amount for the second image, and a pixel value adjustment section that adjusts the pixel values of pixels contained in one image out of the first image and the second image based on the light exposure amount ratio.

19 Claims, 18 Drawing Sheets

EXAMPLE OF IMAGES WHEN CAMERA SHAKE HAS OCCURRED

SHORT LIGHT EXPOSURE TIME IMAGE

LONG LIGHT EXPOSURE TIME IMAGE

INPUT IMAGE 1

INPUT IMAGE 2

EXAMPLE OF IMAGES WHEN SUBJECT HAS MOVED

IMAGE PROCESSING APPARATUS, METHOD AND IMAGING APPARATUS

CROSS-REFERENCE TO RELATED APPLICATION

This application is based upon and claims the benefit of priority of the prior Japanese Patent Application No. 2013-011482, filed on Jan. 24, 2013, the entire contents of which are incorporated herein by reference.

FIELD

The embodiments discussed herein are related to an image processing apparatus, an image processing method, a recording medium that stores an image processing program, and an imaging apparatus.

BACKGROUND

Normally, when image capture is performed with an imaging apparatus such as a digital camera, limitations to the dynamic range of image sensors result in occasions arising in which there is white out of background, and faces of people are in-filled in black due to, for example, backlighting.

In order to eliminate such white out and black in-fill, a commonly known method to broaden the dynamic range is to synthesize together images captured with plural different image capture conditions that have different light exposure times. In such a method, for example, a short light exposure time image is captured set with a fast shutter speed, and a long light exposure time image is captured set with a slow shutter speed. Then, after performing brightness matching such that the brightness of the long light exposure time image and the short light exposure time image are equivalent, the long light exposure time image and the short light exposure time image are synthesized together by using the bright region of the short light exposure time image and using the dark region of the long light exposure time image. As a result, an unnatural join occurs in the brightness of the synthesized image when brightness matching has not been accurately performed, leading to a deterioration in quality of the synthesized image.

Moreover, when two images with different image capture times are synthesized together as described above, sometimes positional misalignment arises due to camera shake between the two images, and sometimes subject blur occurs due to the subject moving. If images in which camera shake and subject blur have occurred are employed to perform synthesis, then double images appear of the subject, with a deterioration in the quality of the synthesized image. There is a method proposed to eliminate quality deterioration of a synthesized image caused by such camera shake and subject blur by detecting camera shake and subject blur between two images, and then applying a correction during image synthesis. In such a method, an image is synthesized by performing alignment during image synthesis by translation movement of an image by the detected camera shake amount, or by using appropriate pixel values from out of the short light exposure time image and the long light exposure time image in the subject blur region.

A known detection method for such camera shake and subject blur is implemented based on differences in brightness values between two images. There is a need to accurately perform brightness alignment between the two images when camera shake or subject blur is detected based on the brightness value differences. When brightness alignment is not accurately performed, sometimes a large difference in brightness values also arises in regions that have not moved, and sometimes camera shake and subject blur are falsely detected, and inappropriate correction processing performed during image synthesis results in a deterioration in quality in the synthesized image.

As described above, there is a need to perform accurate brightness alignment during synthesizing together the short light exposure time image and the long light exposure time image. The light exposure amount ratio between the light exposure amount of the short light exposure time image and the light exposure amount of the long light exposure time image, which is needed in order to perform this brightness alignment, may be derived from image capture conditions such as the shutter speed. However, there is a possibility of the light exposure amount ratio in the actual captured image being different to the light exposure amount ratio in the derived image capture conditions due to changes in the lighting source environment or errors in the setting values.

There is a proposal for deriving the light exposure amount ratio from actual captured images. For example, there is a proposal for a method in which the light exposure amount ratio between the long light exposure time image signal and the short light exposure time image signal is detected for each of blocks that are formed by portioning up the captured image. In this method, based on the detected light exposure amount ratio for each of the blocks, gain adjustment is performed by block on the long light exposure signal and the short light exposure signal to broaden the dynamic range.

There is also a proposal to compare the peak value detected by a detection section against a threshold value, and to control the light exposure time of the short light exposure time. When the comparison result is within a fixed range, the light exposure time is further controlled such that the peak value matches the threshold value. In such a method, in the threshold values for the peak value detected by the detection section, values are set to widen the gradation of a high brightness subject. Moreover, gain control processing and gamma correction setting is performed by an AGC section so as to give a wide gradation of the short light exposure time image from the histogram distribution of the short light exposure time images. Even in synthesis processing between the short light exposure time image and the long light exposure time image, synthesis is performed at a predetermined rate matched to respective patterns out of patterns of histogram distributions.

RELATED PATENT DOCUMENTS

Japanese Laid-Open Patent Publication No. 2002-101347
Japanese Laid-Open Patent Publication No. 2001-339633
Japanese Laid-Open Patent Publication No. 2009-213032

SUMMARY

According to an aspect of the embodiments, an image processing apparatus includes: a histogram computation section that, for plural images with different light exposure amounts captured by an image capture section, computes for each of the images a histogram expressing the number of pixels of each pixel value in the pixels contained in each of the respective plural images; a light exposure amount ratio computation section that, based on a degree of similarity between a profile of a first histogram computed from a first image out of the plural images and a profile of a second histogram computed from a second image out of the plural images, computes, as a light exposure amount ratio, a ratio between a light exposure amount for the first image and a light exposure amount for the second image; a pixel value adjustment section that adjusts the pixel values of pixels contained in one image out of the first image or the second image based on the light exposure amount ratio computed by the light exposure amount ratio computation section; and a synthesis section that synthesizes together the one image out of the first image or the second image after pixel value adjustment by the pixel value adjustment section and the other image out of the first image or the second image after pixel value adjustment by the pixel value adjustment section.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding an exemplary embodiment of technology disclosed herein, with reference to the drawings.

First Exemplary Embodiment

Figure 1:
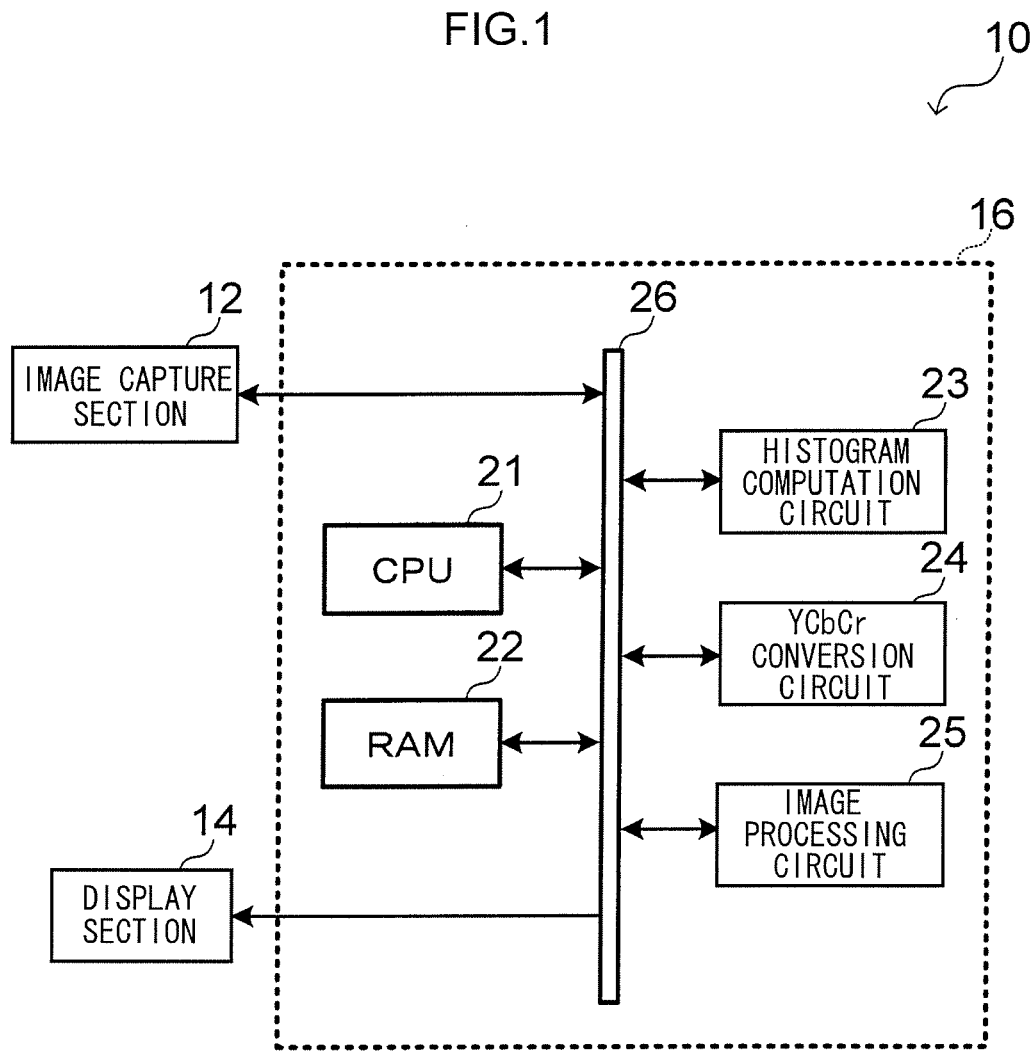
FIG. 1 is a block diagram illustrating an example of a configuration of an imaging apparatus according to a first exemplary embodiment.

FIG. 1 illustrates an imaging apparatus 10 according to a first exemplary embodiment. The imaging apparatus 10 includes an image capture section 12, a display section 14 and an image processing section 16.

The image capture section 12 includes an image pick-up device such as for example a Charge Coupled Device (CCD) or a Complementary Metal Oxide Semiconductor (CMOS), a group of lenses including plural optical lenses, an aperture adjustment mechanism, a zoom mechanism and an automatic focus point adjustment mechanism. Note that the zoom mechanism may be omitted, and change in the imaging times implemented by an electronic zoom. On instruction to take an image, the image capture section 12 converts an electrical signal (analogue signal) image captured by the image pick-up device according to set imaging conditions into a digital signal and outputs the converted signal. The digital signal output at this stage is so-called RAW data prior to processing into 3 primary color data based on various data set in the image capture section 12.

The display section 14 is, for example, a liquid crystal display. The display section 14 displays an image that has been captured by the image capture section 12 and image processed by the image processing section 16. Configuration may be made such that a menu screen is displayed for performing various types of setting.

The image processing section 16, as illustrated in FIG. 1, includes a Central Processing Unit (CPU) 21, a Random Access Memory (RAM) 22, a histogram computation circuit 23, a YCbCr conversion circuit 24, and an image processing circuit 25. The image processing section 16 is, for example, an image processing processor. The image processing section 16 receives as input RAW data output from the image capture section 12, and performs image processing, as described later. Note that the image processing section 16 is an example of an image processing apparatus of technology disclosed herein.

The CPU 21 instructs the image capture section 12 to perform image capture according to specific image capture conditions. In the present exemplary embodiment, for a single time of image capture instruction, instruction is made for image capture with image capture conditions set with a fast shutter speed and a short light exposure time, and for image capture with image capture conditions set with a slow shutter speed and a long light exposure time. Moreover, the CPU 21 acquires RAW data_S captured and output by the image capture section 12 under image capture conditions of a short light exposure time, and acquires RAW data_L captured and output by the image capture section 12 under image capture conditions of a long light exposure time. The CPU 21 stores these data in the RAM 22. Note that when not discriminating between the RAW data_S and the RAW data_L reference is made simply to "RAW data".

Moreover, the CPU 21 controls the input and output of data between the RAM 22 and the histogram computation circuit 23, the YCbCr conversion circuit 24 and the image processing circuit 25.

Figure 2:
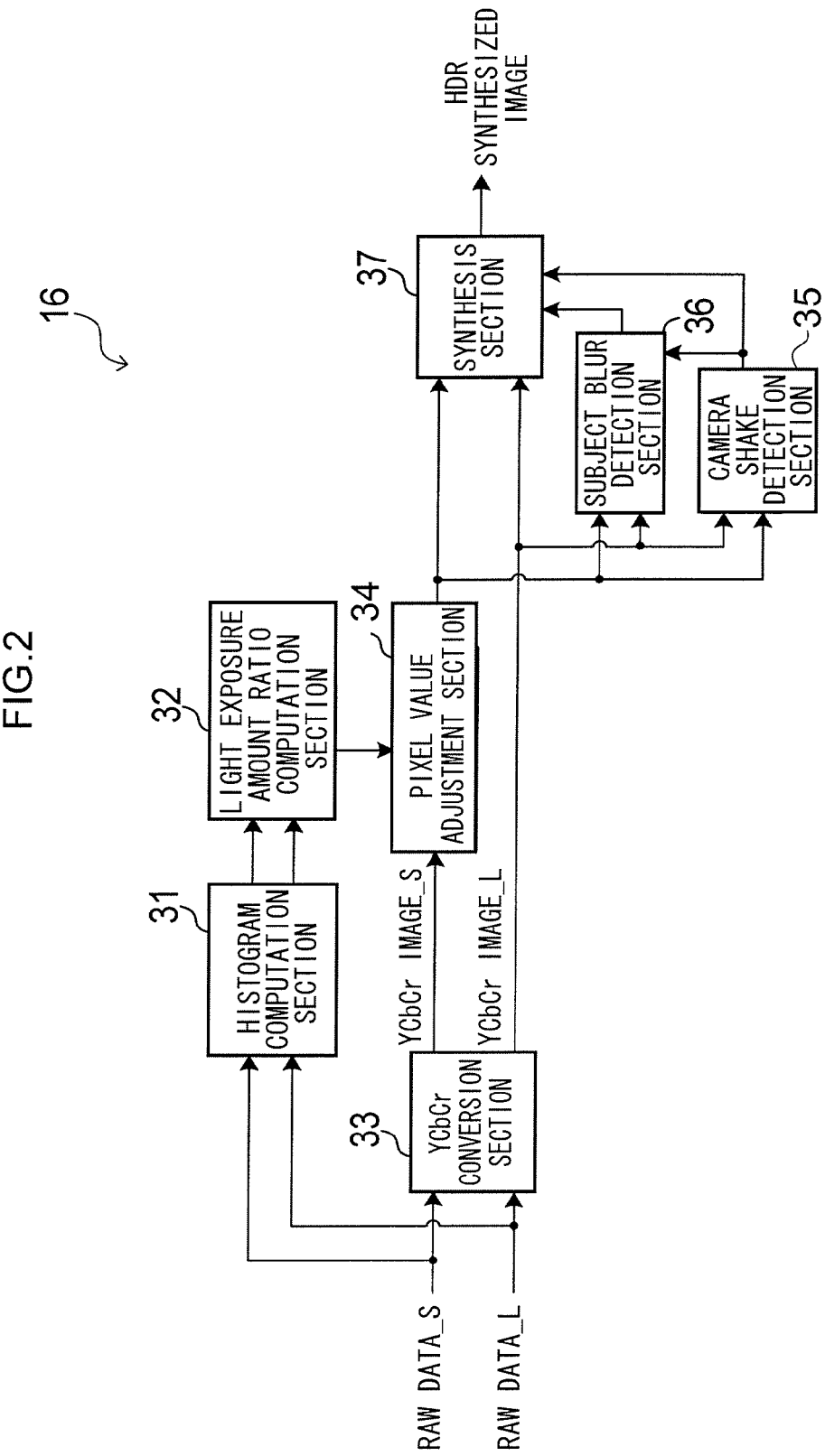
FIG. 2 is a block diagram illustrating an example of a functional configuration of an image processing section.

An example of a functional configuration of the image processing section 16 is illustrated in FIG. 2. The image processing section 16 includes a histogram computation section 31, a light exposure amount ratio computation section 32, a YCbCr conversion section 33, a pixel value adjustment section 34, a camera shake detection section 35, a subject blur detection section 36, and a synthesis section 37. The histogram computation section 31 is a block that represents the function of the histogram computation circuit 23. The YCbCr conversion section 33 is a block that represents the function of the YCbCr conversion circuit 24. The light exposure amount ratio computation section 32 is a block that represents a function executed by the CPU 21. The pixel value adjustment section 34, the camera shake detection section 35, the subject blur detection section 36 and the synthesis section 37 are blocks that represent the functions of the image processing circuit 25.

Figure 3:
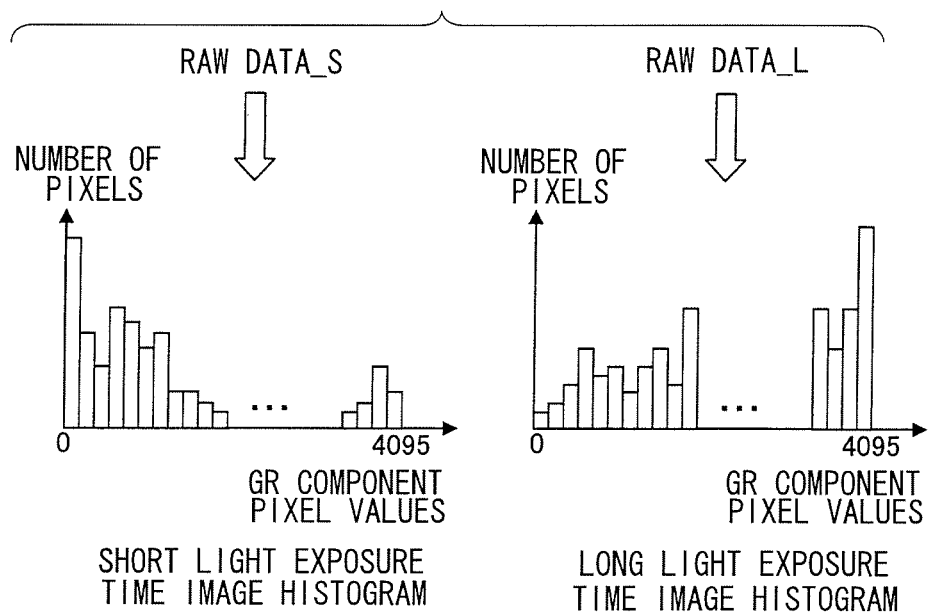
FIG. 3 is a schematic diagram to explain computation of histograms.

The histogram computation section 31 computes a histogram of a short light exposure time image from the RAW data_S, and computes a histogram of a long light exposure time image from the RAW data_L. For example a number of pixels is derived for each pixel value of Gr components in the RAW data acquired through a Bayer array color filter disposed over an image pick-up device, and a histogram such as that illustrated in FIG. 3 is computed. Note that configuration may be made such that pixel values of the R components or the B components in the RAW data are employed to compute a histogram. However, use of the pixel values of the G component is preferable since the Gr component is closest to the brightness component. Moreover, configuration may be made such that RGB values are computed for each of the pixels using the pixel values of adjacent pixels, so as to compute a histogram of the derived brightness values. Moreover, configuration may be made such that after computing RGB values of each of the pixels by employing the pixel values of adjacent pixels, brightness values are also computed for each of the pixels, such that a histogram of derived brightness values is computed. Moreover, there is no limitation to cases in which a histogram is computed employing all the pixels (or in cases in which a particular component is employed, employing all the pixels for the component), and configuration may be made such that, for the pixels to be employed in the histogram, appropriate thinning is performed in consideration of the computation precision and processing speed of the histogram.

Based on the histogram of the short light exposure time image and the histogram of the long light exposure time image computed by the histogram computation section 31, the light exposure amount ratio computation section 32 computes the light exposure amount ratio between the light exposure amount for the short light exposure time image and the light exposure amount for the long light exposure time image. Specifically, based on the histogram of the short light exposure time image, the light exposure amount ratio computation section 32 estimates a histogram of a hypothetical image captured with K times the light exposure amount during the short light exposure time image. In the following, the thus estimated histogram is referred to as the "K-times histogram". The light exposure amount ratio computation section 32 then computes as a light exposure amount ratio N the value of K when the profile of the K-times histogram gives the best degree of similarity to the profile of the long light exposure time image histogram.

Explanation next follows regarding the reason why the computation precision of the light exposure amount ratio is raised by using the degree of similarity of histogram profiles. Note that a profile of a histogram in technology disclosed herein means a distribution of the number of pixels for each of the pixel values over the whole range from the lowest limit to the highest limit of pixel values in a histogram expressing the number of pixels at each of the pixel values.

Figure 4:
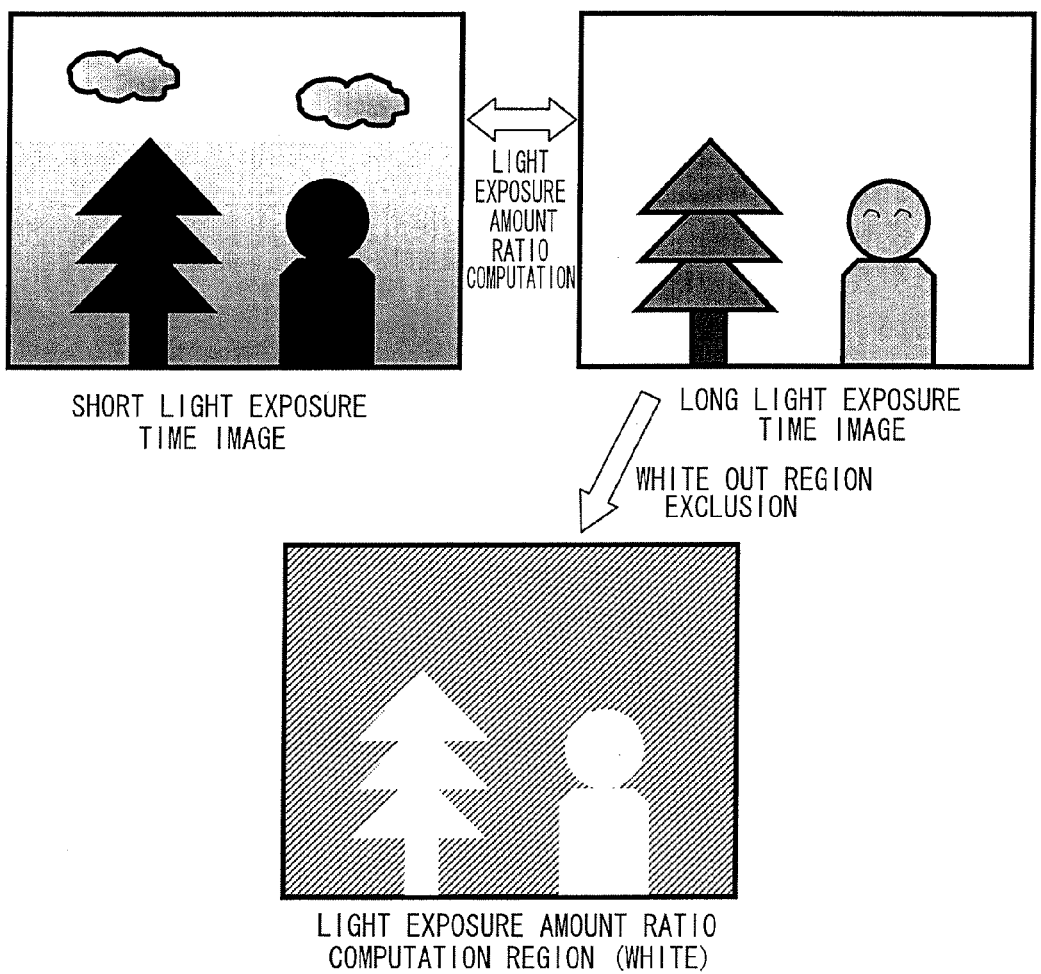
FIG. 4 is a schematic diagram to explain computing a light exposure amount ratio with a conventional method employing a total and average of pixel values.

As a conventional method to compute light exposure amount ratios, there is a method in which the light exposure amount ratio is computed from a sum or an average of pixel values of pixels simply in the image as a whole or in each segmented block of the image. In this method, the pixel values of a region in-filled in black of the short light exposure time image, and the pixel values of white out regions of the long light exposure time image are included in the pixels employed for computing the light exposure ratio, thereby lowering the computation precision of the light exposure amount ratio. As a countermeasure thereto, a possible configuration is, as illustrated in FIG. 4, a light exposure amount ratio computation region that excludes the white out regions from the long light exposure time image, and the uses the pixel values of the pixels contained in the light exposure amount ratio computation region in the short light exposure time image and the long light exposure time image to derive the light exposure amount ratio.

Figure 5:
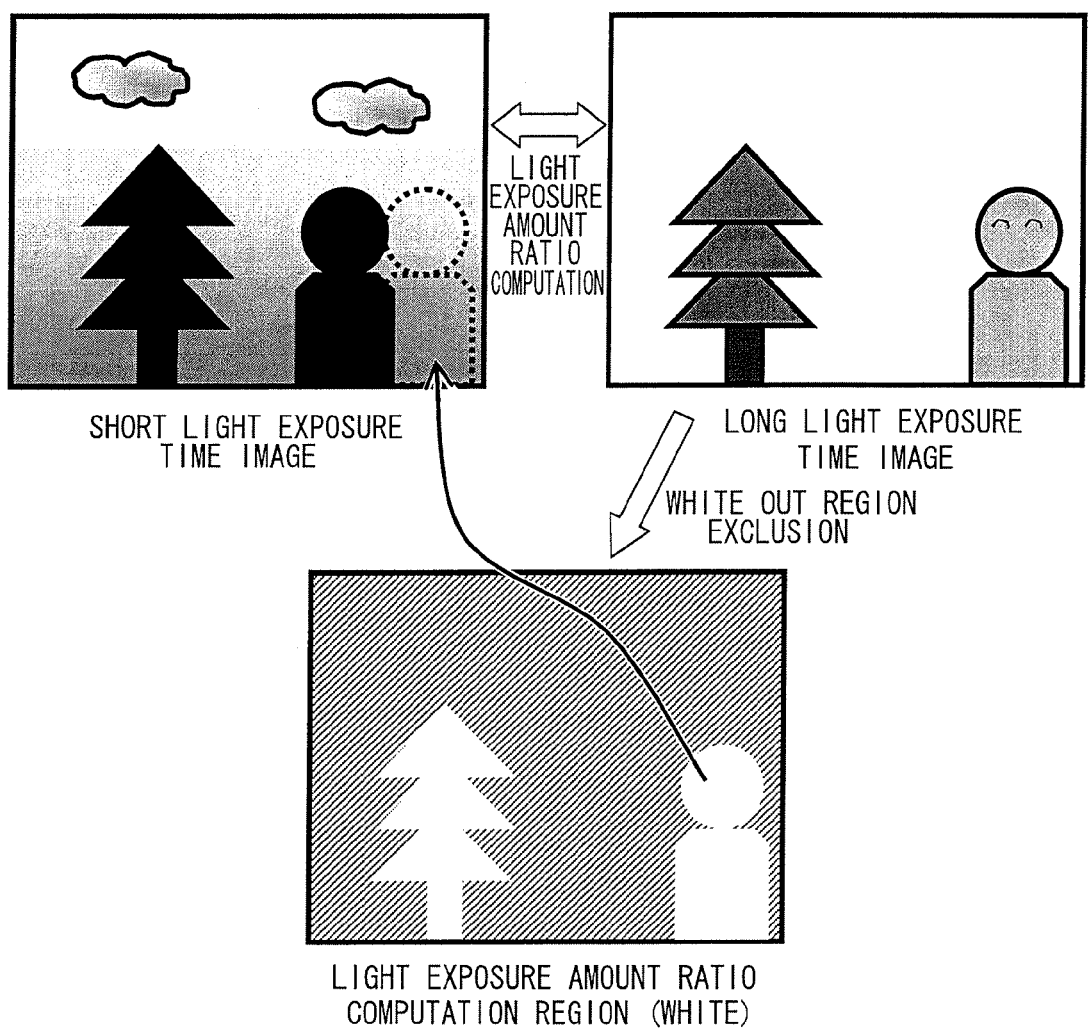
FIG. 5 is a schematic diagram to explain issues with the conventional method employing a total and average of pixel values.

However, as illustrated in FIG. 5, when a subject (a person) has moved between the two images, the region in the light exposure amount ratio computation region corresponding to the subject (the person) is not the subject (the person) in the short light exposure time image, but is the background region, so that an accurate light exposure amount ratio is not computed.

Even when the subject has moved as described above, since the type of subjects captured in the image (a tree, sky, clouds and a person in the example of FIG. 5) do not change, there is no large change in the profile of the histogram computed from the images. Thus in the present exemplary embodiment, the light exposure amount ratio is computed accurately by using a degree of similarity in profile of histograms even when there is movement in the subject.

Figure 6:
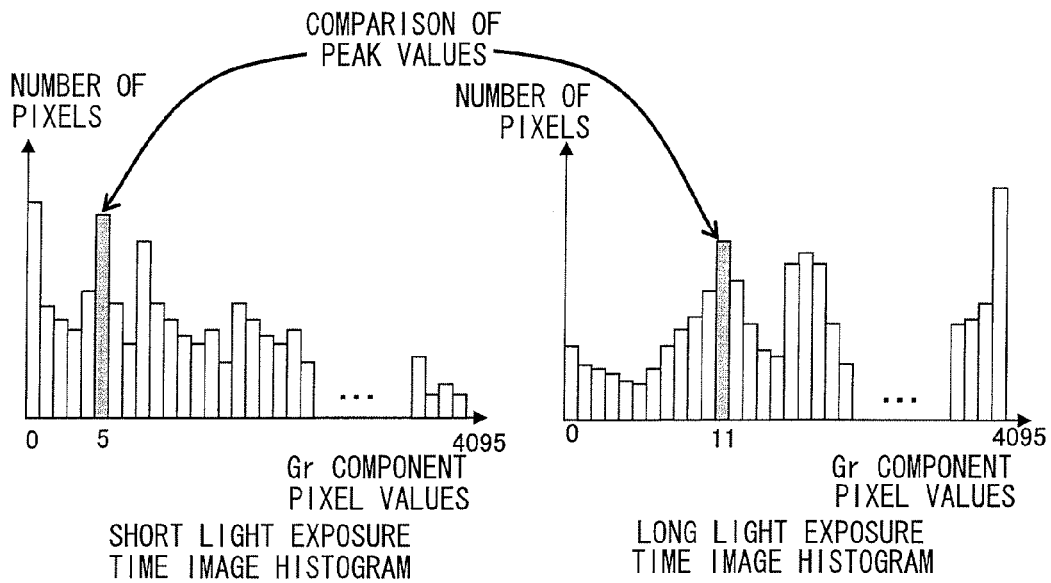
FIG. 6 is a schematic diagram to explain computation of a light exposure amount ratio with a conventional method employing peak values of pixel values.

As a conventional method to compute the light exposure amount ratio, there is also a method to compute the light exposure amount ratio using peak values of pixel values. For example, as illustrated in FIG. 6, pixel values (peak values) are detected where the number of pixels is at a maximum in each of the respective histograms of the short light exposure time image and the long light exposure time image, and the light exposure amount ratio is computed from the detected peak values from each of the histograms. In the example of FIG. 6, a light exposure amount ratio is computed as 5/11, from a peak value 5 in the histogram of the short light exposure time image and a peak value 11 in the histogram of the long light exposure time image.

There is the following problem with such a light exposure amount ratio computation method. First, the short light exposure time image has a high noise level with respect to signal level, and is readily affected by noise, with the possibility that the peak value fluctuates due to the influence of noise when there are plural extremely large values present in the image. Moreover, it is similarly also conceivable that peak values could vary due to the influence of quantization errors. Moreover, there is a high probability that in the long light exposure time image, the pixel values in the vicinity of the maximum values are saturated, with the possibility that the peak values cannot be detected accurately.

The light exposure amount ratio is not performed accurately when the peak values are not detected accurately due to the reason stated above. A conceivable configuration to eliminate such detection of false peak values is one in which peak values are detected after excluding pixel values in the vicinity of minimum values and pixel values in the vicinity of maximum values. The very extreme values representing the vicinity of the minimum values and the maximum values are also excluded in peak value detection in the example of FIG. 6.

However, since the light exposure amount ratio is not derived unless accurate values of the excluded region are known, it is necessary to detect the peak values according to the estimated excluded region. Suppose that the estimated exclusion region is too narrow, there is a possibility that saturated pixel values in the long light exposure time image is detected as the peak values. Moreover, if the estimated exclusion region is too wide then there is a possibility that the peak values is included in the exclusion region, with the possibility that correct peak values is not detected.

Due to the above reason, in a conventional method employing peak values, the detection precision of the peak values falls according to the estimation precision of the exclusion region, with a possibility that this leads to a reduction in the computation precision of the light exposure amount ratio.

However, in the present exemplary embodiment, the light exposure amount ratio is computed by employing the degree of similarity between histogram profiles. Considering that there is no large change in the histogram profile even when noise or quantization errors occur, the light exposure amount ratio is be accurately computed excluding the influence from noise or quantization errors. There is also no need to estimate an exclusion region in the histograms, and so issues like those of the above conventional methods do not occur.

For the above reason, the light exposure amount ratio computation section 32 computes a light exposure amount ratio N from the degree of similarity between the histogram profiles of the K-times histogram profile and the long light exposure time histogram profile. Note that in the present exemplary embodiment, the RAW data that has linear characteristics to the incident light levels to the image pick-up device is employed as the short light exposure time image and the long light exposure time image, thereby enabling an accurate light exposure amount ratio to be computed.

Figure 7:
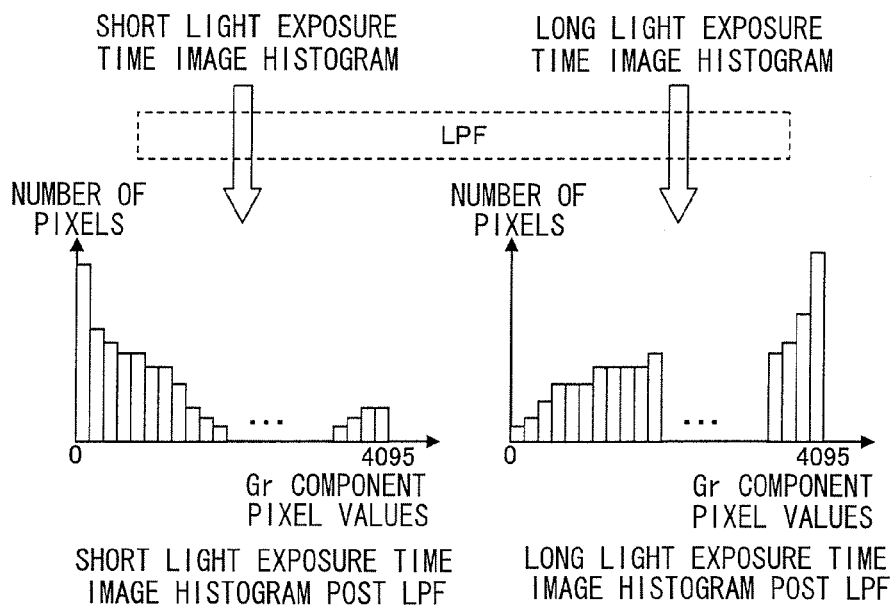
FIG. 7 is a schematic diagram to explain computation of degree of similarity between histogram profiles.

Specifically, as illustrated in FIG. 7, the light exposure amount ratio computation section 32 first applies a low pass filter (LPF) respectively to a histogram of the short light exposure time image and a histogram of the long light exposure time image to perform smoothing. This thereby enables the influence from noise components contained in the RAW data to be reduced.

The light exposure amount ratio computation section 32 estimates the K-times histogram profile from a histogram of the short light exposure time image post LPF. More specifically, the number of pixels of each of the pixel values in the histogram of the short light exposure time image post LPF are split up and allocated to pixel values portions corresponding to a histogram that is K-times the pixel values to estimate a K-times histogram.

Note that in order to compute the degree of similarity between the profiles of the K-times histogram and the long light exposure time image histogram the ranges of the pixel values need to be aligned between the K-times histogram and a histogram of the long light exposure time image. For example, in the K-times histogram, the pixel value ranges is aligned by adding the number of pixels in the K-times histogram of a pixel value larger than the maximum pixel value prior to multiplying by K, to the number of pixels of the maximum pixel value prior to multiplying by K. Moreover, the number of pixels larger than the maximum pixel value prior to multiplying by K may also be split up and added not only to the maximum pixel value, but also to plural pixel values in the vicinity of the maximum pixel value, or to all the pixel values of the maximum pixel value or lower.

Figure 8:
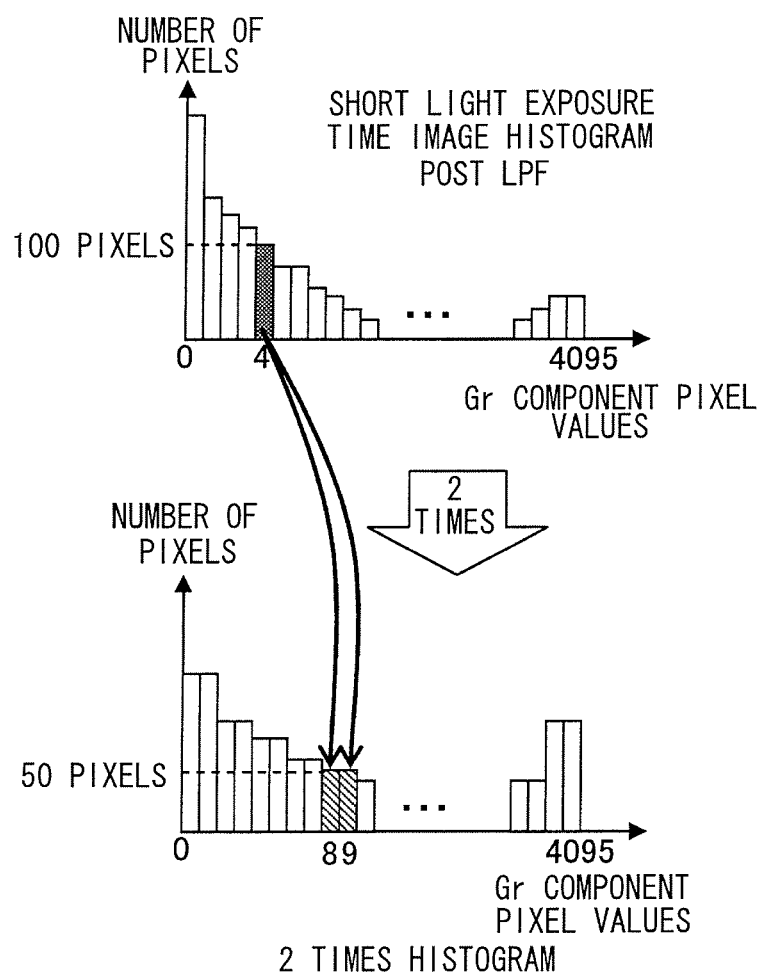
FIG. 8 is a schematic diagram to explain computation of degree of similarity between histogram profiles.

For example, explanation follows regarding a K-times histogram estimation method in an example of a case in which K=2, maximum pixel value=4095, and the number of pixels of pixel value 4 in the short light exposure time image histogram post LPF is 100. As illustrated in FIG. 8, in a 2-times histogram, there are 100 pixels split up and allocated to the pixel value 8 and the pixel value 9 that correspond to twice the pixel value 4. For example, 50 pixels may be allocated to the pixel value 8 and 50 pixels may be allocated to the pixel value 9 in the two times histogram. Similar allocation may also be made to pixel values corresponding to the K-times histogram for other pixel values in the short light exposure time image. Finally, in the 2-times histogram, the sum of the number of pixels of the pixel values 4096 to 8190 may be added to the number of pixels of the pixel value 4095, thereby enabling the 2-times histogram to be estimated.

Moreover, in the light exposure amount ratio computation section 32, a degree of similarity in profile is derived between the K-times histogram and the long light exposure time image histogram post LPF, and the light exposure amount ratio N computed at the K times that achieves the maximum degree of similarity.

Figure 9:
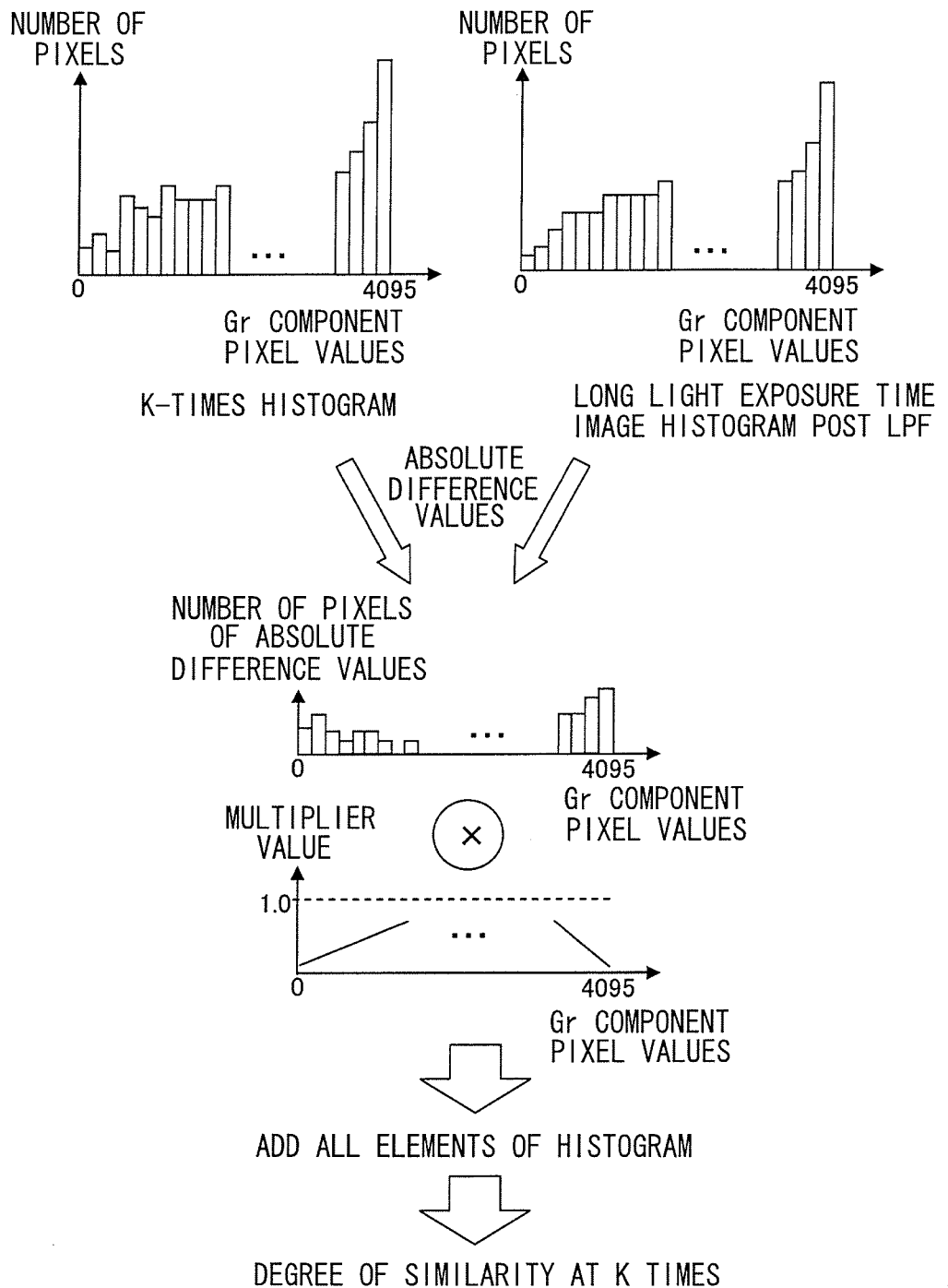
FIG. 9 is a schematic diagram to explain computation of degree of similarity between histogram profiles.

As an example of a computation of degree of similarity, explanation follows regarding a Sum of Absolute Difference (SAD) method with reference to FIG. 9. First an absolute difference value is derived between the number of pixels of each of the pixel values of the K-times histogram and the number of pixels of each of the pixel values corresponding to the histogram of the long light exposure time image post LPF. This absolute difference value is multiplied by multiplier values set to weight pixel values in the histogram more the nearer they are to the center values. Dark pixel values have a higher noise level with respect to the signal level, with these being more readily influenced by noise. Moreover, there is a possibility that due to the characteristics of the sensor the light pixel values close to the saturated region may have non-linear characteristics with respect to incident light levels, and there is a possibility that the correct light exposure amount ratio may not be able to be derived. Accordingly, computation of the degree of similarity that gives more emphasis to the influence of the pixel values close to the central value than to pixel values of the dark pixel values and the light pixel values close to the saturated region enables the degree of similarity to be computed with high precision. Note that even the multiplier values corresponding to pixel values far away from the central value are set so as not to be 0 in order to view the degree of similarity between the profiles of the histogram overall.

The values of each of the pixel values arising from multiplying the absolute difference values of the number of pixels by the multiplier values in the manner described above enables a sum of absolute difference values to be computed as the degree of similarity between the histogram profiles by adding together portions for all the elements (all pixel values) of the histogram. In such cases, since as the absolute difference value sum gets smaller this indicates that the degree of similarity between the profiles of the two histograms is getting larger, the degree of similarity is the maximum when the absolute difference value sum is the minimum.

Note that the degree of similarity computation method is not limited to the example described above as long as it is able to compute the degree of similarity of histogram profiles. For example, a Sum of Squared Differences (SSD) or a correlation coefficient may be derived as the degree of similarity. Moreover, configuration may be made such that squared differences of pixel values are derived as a relationship value indicating the relationship between the number of pixels of each of the pixel values of the K-times histogram and the number of pixels of each of the pixel values corresponding to the long light exposure time image histogram, these then multiplied by multiplier values as described above and added together for portions of all of the pixel values of the histogram to derive a value as the degree of similarity.

Figure 10:
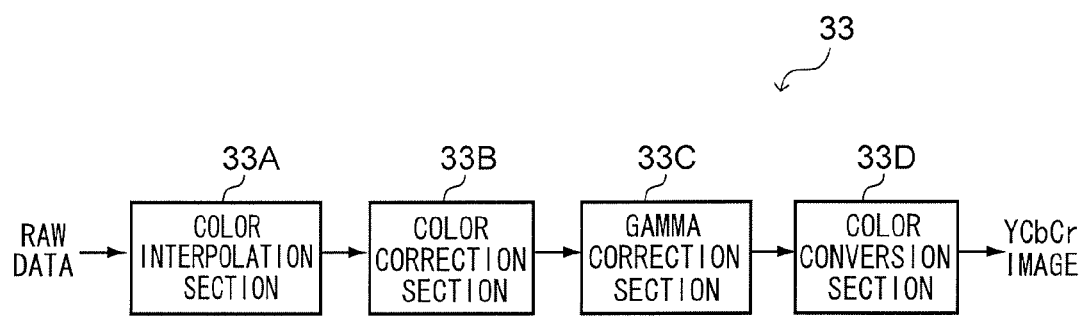
FIG. 10 is a block diagram illustrating an example of a functional configuration of a YCbCr conversion section.

As illustrated in FIG. 10, the YCbCr conversion section 33 includes a color interpolation section 33A, a color correction section 33B, a gamma correction section 33C, and a color conversion section 33D, and converts the RAW data_S into a YCbCr image_S, and converts the RAW data_L into a YCbCr image_L.

The color interpolation section 33A converts Bayer array RAW data into RGB images by color interpolation processing.

The color correction section 33B performs color correction processing such as white balance correction and color emphasis adjustment processing so as to display an image of the correct color on the display section 14.

The gamma correction section 33C performs gamma correction processing on the RAW data that has linear characteristics with respect to the incident light level to the image pick-up device to give data corresponding to data for content storage such as JPEG data.

The color conversion section 33D performs color conversion to change RGB images into YCbCr images.

The pixel value adjustment section 34 multiplies each of the pixel values Y, Cb and Cr of the YCbCr image_S of the short light exposure time image converted by the YCbCr conversion section 33 by the value of light exposure amount ratio N computed by the light exposure amount ratio computation section 32 raised to the power $1/\gamma$. Note that $\gamma$ is a gamma correction value employed by the gamma correction section 33C of the YCbCr conversion section 33, and is for example 2.2. In order to appropriately perform gamma correction processing when RAW data is converted into a YCbCr image, it is not possible to apply the light exposure amount ratio computed using the RAW data to the YCbCr as it is. Thus the light exposure amount ratio computed using the RAW data is be converted into a light exposure amount ratio appropriate for use on the YCbCr image post gamma correction processing by raising the light exposure amount ratio N to the power $1/\gamma$.

Moreover, by taking $N^{(1/\gamma)}$ times the pixel values of each of the pixel values of the YCbCr image_S, the number of bits representing the pixel values of each of the pixels of the YCbCr image_S output from the pixel value adjustment section 34 increases. For example, in cases in which the YCbCr image_S output from the YCbCr conversion section 33 is an image with 8 bit gradation, each of the pixels of the YCbCr image_S holds data of 0 to 255. When the pixel values of each of the pixels are multiplied for example by 4, then this gives an image in which each of the pixels holds data of 0 to 1020, namely conversion into a 10 bit gradation image.

In the following, an image in which the pixel values of each of the pixels in the pixel value adjustment section 34 have been multiplied by $N^{(1/\gamma)}$ is denoted "N*YCbCr image_S".

The camera shake detection section 35 computes a camera shake amount between two images based on the N*YCbCr image_S pixel value adjusted by the pixel value adjustment section 34 and the YCbCr image_L converted by the YCbCr conversion section 33, and outputs the camera shake amount.

Figure 11:
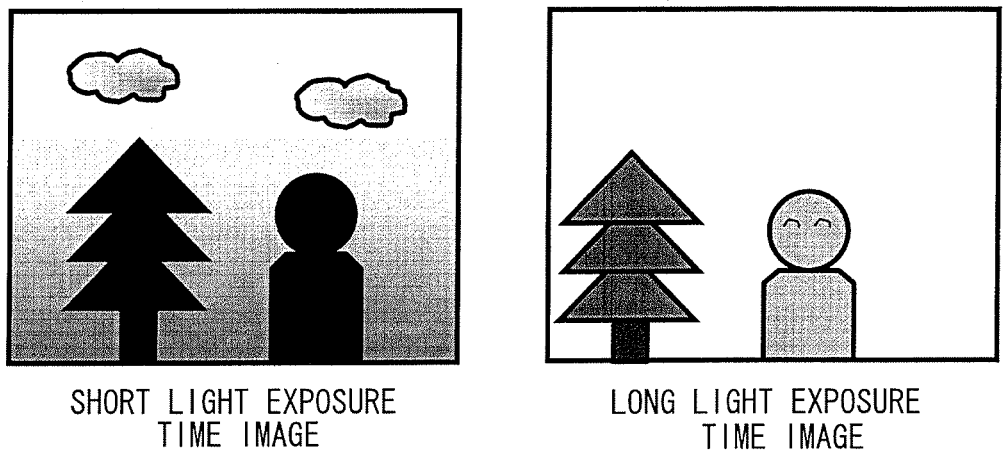
FIG. 11 is a diagram illustrating occurrence of camera shake.

When camera shake occurs between the short light exposure time image capture time and the long light exposure time image capture time, the position of the subject differs between the images, as illustrated in FIG. 11. When the image in which camera shake has occurred is employed to synthesize an image, sometimes white out pixels are at the same position as pixels in the background even when pixel values of pixels in the long light exposure time image are employed for locations in-filled in black on the short light exposure time image. The camera shake amount between the two images is accordingly computed so as to use images corrected for the camera shake between two images during image synthesis.

Figure 12:
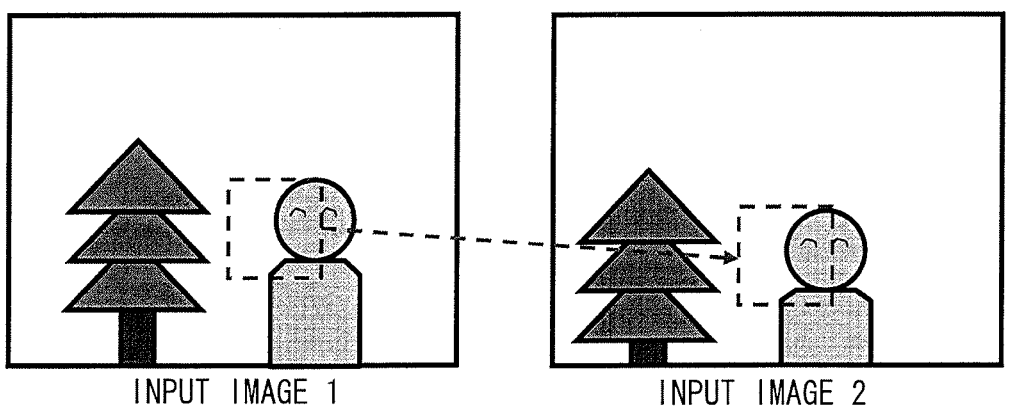
FIG. 12 is a schematic diagram to explain camera shake detection.

More specifically, as illustrated in FIG. 12, rectangular blocks are partitioned in an input image 1, and then for each of the rectangular blocks, a movement amount is computed by searching for where that block is positioned in the input image 2. A known block matching method may be employed for this search. The average value of the movement amount computed for all of the blocks in the input image 1 is then computed as the camera shake amount. Note that in the camera shake detection section 35, the input image 1 and the input image 2 are the N*YCbCr image_S and the YCbCr image_L, with either being the input image 1 or the input image 2.

The subject blur detection section 36 detects the subject blur between the two images based on the N*YCbCr image_S that has been pixel value adjusted by the pixel value adjustment section 34 and the YCbCr image_L that has been converted by the YCbCr conversion section 33.

Figure 13:
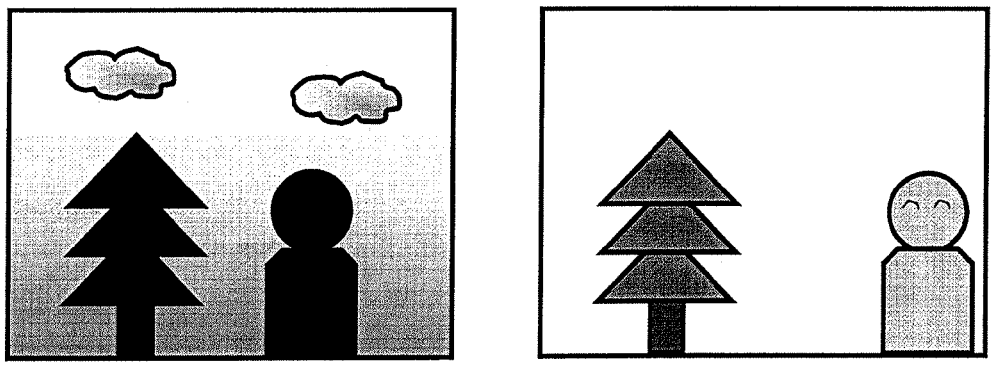
FIG. 13 is a diagram illustrating when subject movement has occurred.

The position of the subject is different between the two images when there is movement of the subject between the short light exposure time image capture time and the long light exposure time image capture time, as illustrated in FIG. 13. Therefore, similarly to cases in which camera shake has occurred as described above, an issue arises in that the subject appears in double if the two images are synthesized without modification. The subject blur between the two images is accordingly detected, and images corrected for subject blur between the two images are employed during synthesis.

Figure 14:
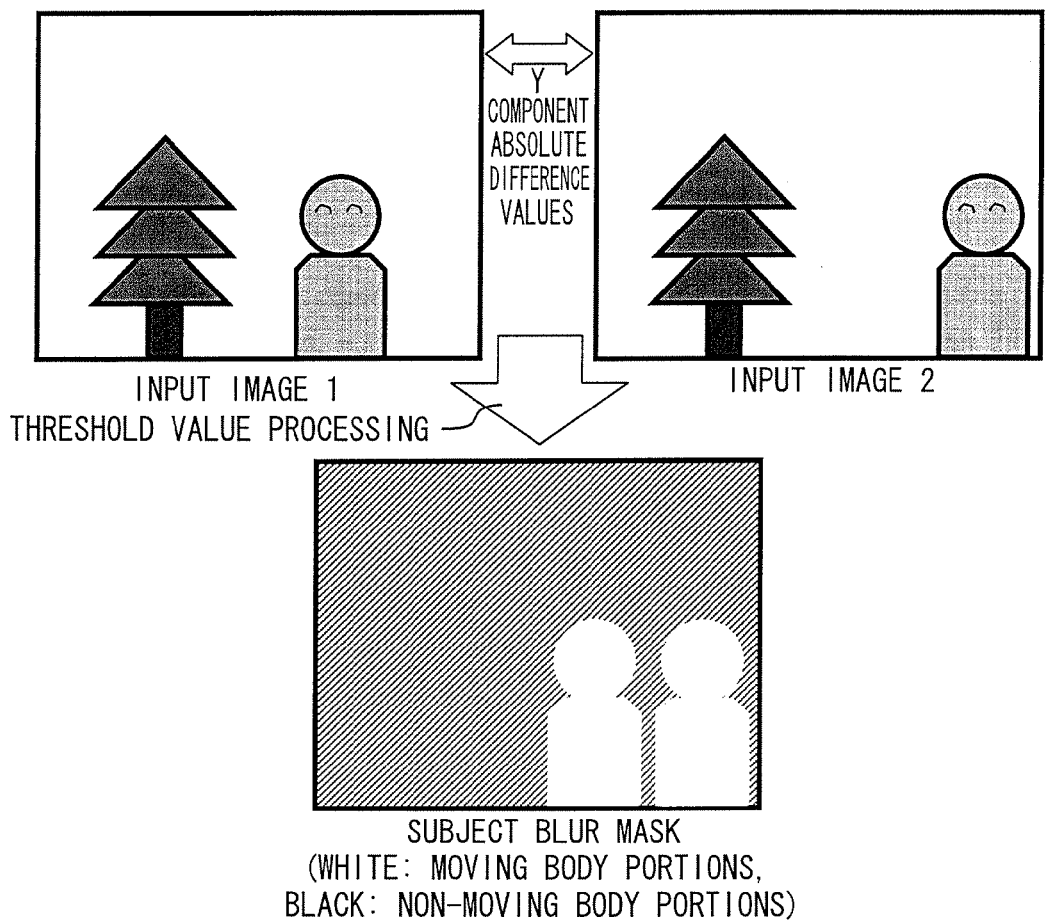
FIG. 14 is a schematic diagram to explain subject blur detection.

More specifically, first the camera shake amount output from the camera shake detection section 35 is received, and camera shake is corrected by performing positional alignment between the two frames by translation movement of the input image 2 with respect to the input image 1 by the camera shake amount. Then, as illustrated in FIG. 14, the Y components (brightness components) of the input images are employed to determine the absolute difference values for each of the pixels between the two input images. Then a subject blur mask is generated and output in which pixels where the absolute difference values are a specific threshold value or greater are treated as moving bodies, and pixels where the absolute difference values are less than the threshold value are treated as non-moving bodies. Note that in the subject blur detection section 36, the input image 1 and the input image 2 are the N*YCbCr image_S and the YCbCr image_L, and either may be used as the input image 1 or the input image 2.

Figure 15:
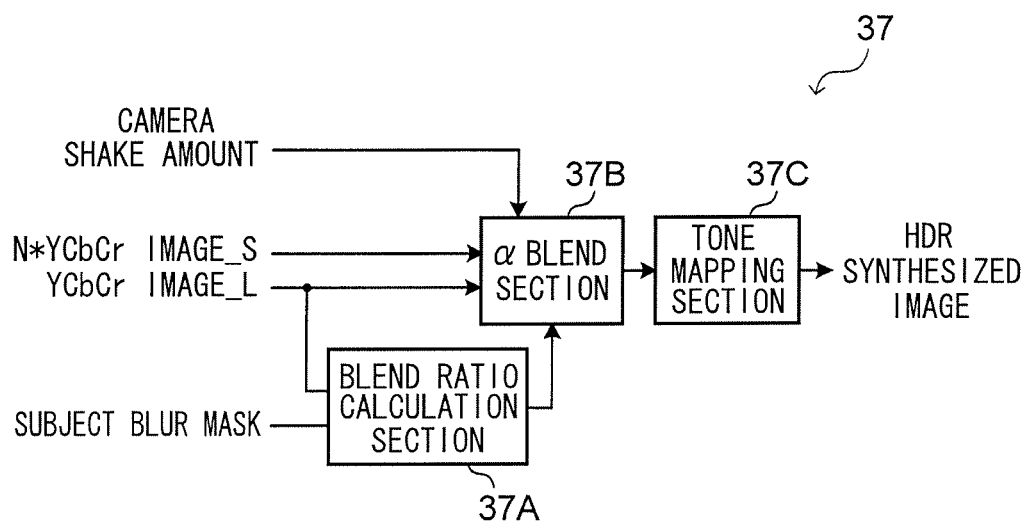
FIG. 15 is a block diagram illustrating an example of a functional configuration of a synthesis section.

As illustrated in FIG. 15, the synthesis section 37 includes a blend ratio calculation section 37A, an blend section 37B and a tone mapping section 37C. A High Dynamic Range (HDR) image is synthesized based on the short light exposure time image and the long light exposure time image. The short light exposure time image input to the synthesis section 37 is the N*YCbCr image_S, and the long light exposure time image is the YCbCr image_L.

Figure 16:
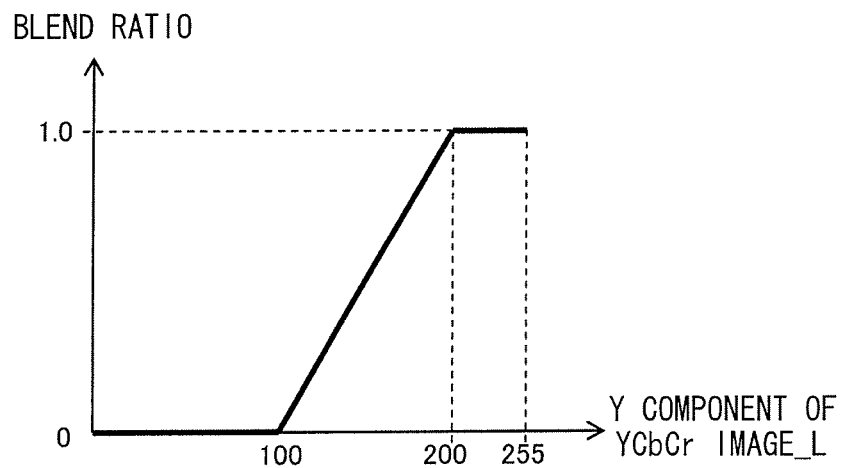
FIG. 16 is a schematic diagram illustrating an example of a table for computing a blend ratio.

The blend ratio calculation section 37A computes the blend ratio for synthesizing together the N*YCbCr image_S and the YCbCr image_L, based on the YCbCr image_L output from the YCbCr conversion section 33 and the subject blur mask output from the subject blur detection section 36. The blend ratio is, for example, a blend ratio that corresponds to the Y components in the YCbCr image_L and is acquired by reference to a predetermined table of relationships between the Y components of the YCbCr image_L and the blend ratio, as illustrated in FIG. 16. The blend ratio may be calculated such that pixels determined by the subject blur mask to be moving bodies and that are not whited out in the YCbCr image_L are employed in the N*YCbCr image_S, and the pixels that are whited out in the YCbCr image_L (those of Y component 255) are employed in the YCbCr image_L.

The α blend section 37B first receives the camera shake amount output from the camera shake detection section 35 and performs positional alignment between the N*YCbCr image_S and the YCbCr image_L to correct for camera shake. Then the N*YCbCr image_S and the YCbCr image_L are synthesized together based on the blend ratio calculated by the blend ratio calculation section 37A. The synthesized image is an image that has the same number of bits (this number of bits is denoted n) as the number of bits of the N*YCbCr image_S.

Figure 17:
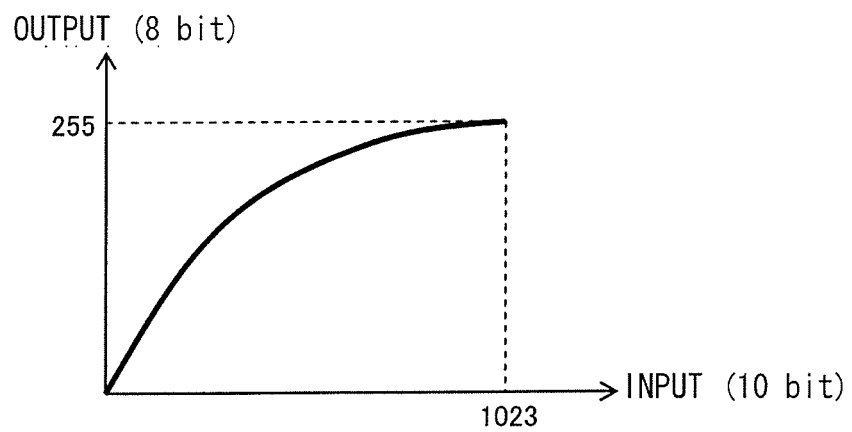
FIG. 17 is a schematic diagram illustrating an example of a table for tone mapping processing.

The tone mapping section 37C performs tone mapping processing on the image synthesized by the α blend section 37B. For example, in cases in which the YCbCr image_L is an image with 8 bits of gradation, the N*YCbCr image_S is an image of n bits, larger than 8 bits, of gradation. It is accordingly not possible to display the image synthesized by the α blend section 37B as it is when the display section 14 is only able to display images of 8 bits of gradation similarly to an ordinary display. Thus tone mapping processing is performed to compress gradation of the n-bit gradation image to an image with 8 bit gradation. The gradation compression may, for example as illustrated in FIG. 17, be performed according to a predetermined gradation conversion table to convert the n bits (n=10 in FIG. 17) to 8 bits. The curve of the table illustrated in FIG. 17 may also be altered according to the scene.

Explanation next follows regarding work of the imaging apparatus 10 according to the first exemplary embodiment. In the imaging apparatus 10, the image processing illustrated in FIG. 18 is executed.

Figure 18:
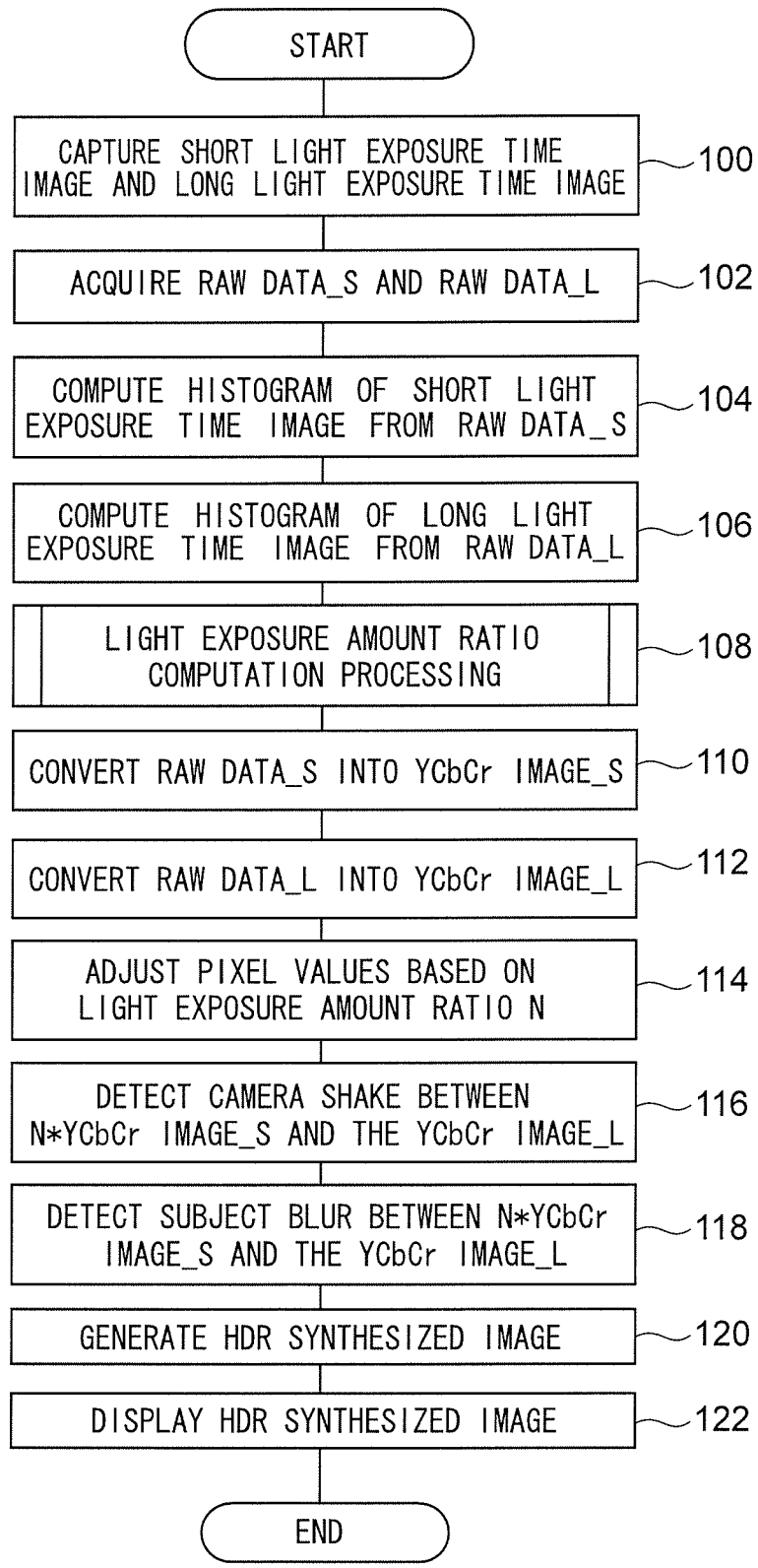
FIG. 18 is a flow chart illustrating image processing in a first exemplary embodiment.

At step 100 of the image processing illustrated in FIG. 18, the CPU 21 captures the short light exposure time image and the long light exposure time image with the image capture section 12 by instructing the image capture section 12 to perform image capture.

Then at step 102, the CPU 21 acquires the RAW data_S representing the short light exposure time image and the RAW data_L representing the long light exposure time image acquired by the image capture section 12, and stores these data in the RAM 22.

Then at step 104, the CPU 21 reads the RAW data_S stored in the RAM 22 and inputs this data to the histogram computation circuit 23. The histogram computation circuit 23 derives the number of pixels of each of the pixel values of the Gr component in the input RAW data_S, and computes a histogram of the short light exposure time image. The CPU 21 stores the histogram of the short light exposure time image computed by the histogram computation circuit 23 in the RAM 22.

Then at step 106, the CPU 21 reads the RAW data_L stored in the RAM 22 and inputs this data to the histogram computation circuit 23. The histogram computation circuit 23 computes a histogram of the long light exposure time image from the input RAW data_L similarly to at step 104. The CPU 21 stores the histogram of the long light exposure time image computed by the histogram computation circuit 23 in the RAM 22.

Then at step 108, the CPU 21 executes light exposure amount ratio computation processing. Explanation next follows regarding the light exposure amount ratio computation processing, with reference to FIG. 19.

Figure 19:
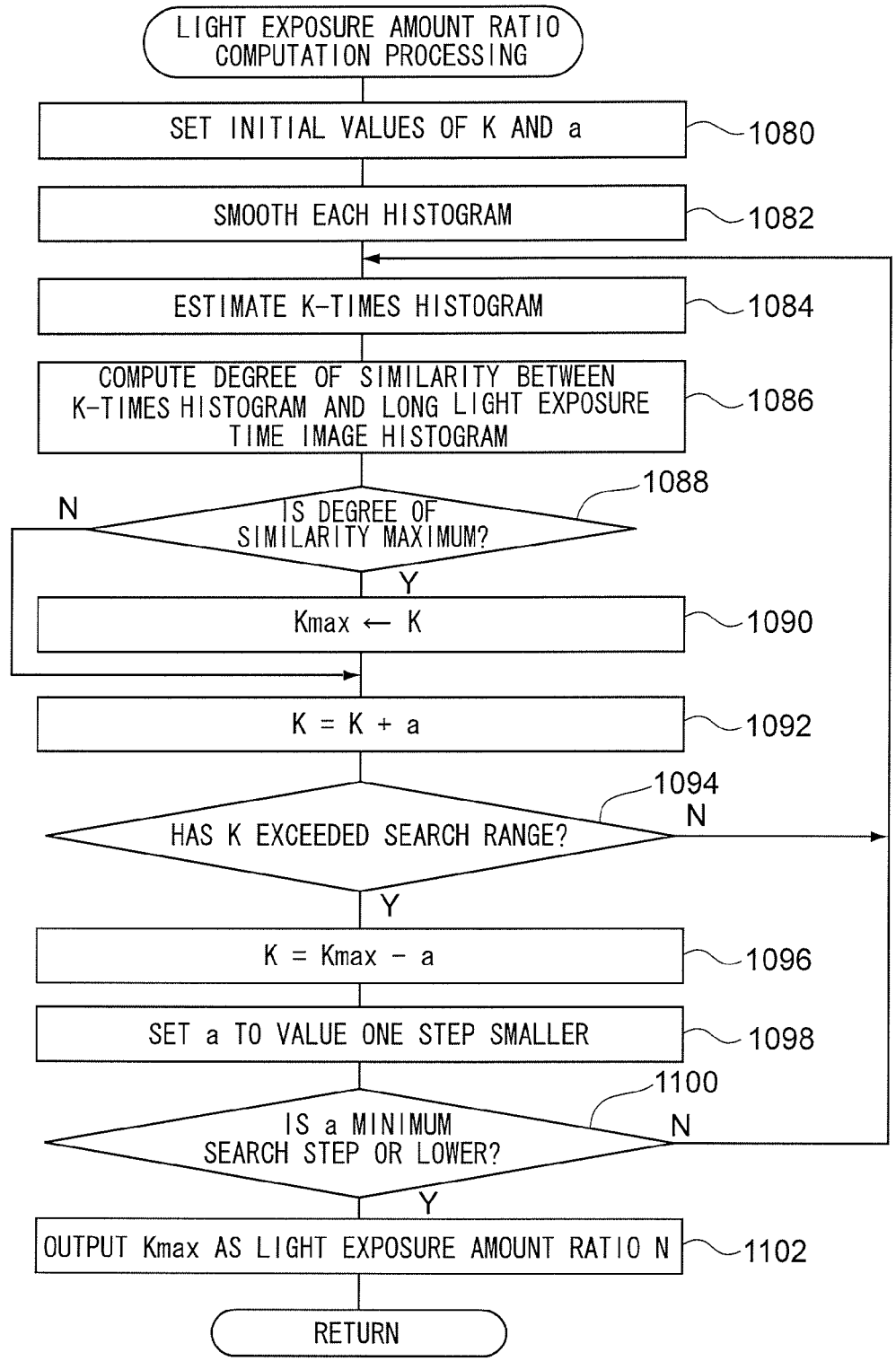
FIG. 19 is a flow chart illustrating light exposure amount ratio computation processing in the first exemplary embodiment.

At step 1080 of the light exposure amount ratio computation processing illustrated in FIG. 19, the CPU 21 sets the initial value of the variable K representing how many times to multiply the pixel values of the histogram of the short light exposure time image and the variable a representing a first search step for K.

Then at step 1082, the CPU 21 applies a LPF to each histogram out of the histogram of the short light exposure time image computed at step 104 and the histogram of the long light exposure time image computed at step 106, so as to perform smoothing thereon.

Then at step 1084, the CPU 21 estimates as a K-times histogram a histogram in which the number of pixels of each of the pixel values of the short light exposure time image post LPF are split and allocated to corresponding pixel values of the K-times histogram.

Then at step 1086, the CPU 21 computes the degree of similarity between the profile of the K-times histogram estimated at step 1084 and the profile of the long light exposure time image histogram smoothed at step 1082.

Then at step 1088, the CPU 21 determines whether or not the degree of similarity computed at step 1086 is the maximum of the degree of similarity computed up to now. Processing proceeds to step 1090 when the degree of similarity is the maximum, the CPU 21 sets the current value of K as Kmax, and processing proceeds to step 1092. However when the degree of similarity is not the maximum, processing skips step 1090 and proceeds directly to step 1092.

At step 1092, the CPU 21 adds a variable a to the current variable K to give a new value of K increased by a first search step amount.

Then at step 1094, the CPU 21 determines whether or not the variable K has exceeded a predetermined search range. Processing returns to step 1084 when the variable K has not yet exceeded the search range, and the processing of steps 1084 to 1092 is repeated for the new K set at step 1092. Processing proceeds to step 1096 when the variable K has exceeded the search range, and the CPU 21 sets as a new value for K the value set as Kmax from which variable a has been subtracted, and at step 1098, the CPU 21 sets the variable a as a value one step smaller so as to make the search range finer.

Then at step 1100, the CPU 21 determines whether or not the variable a has become a predetermined smallest search step or less. Processing returns to step 1084 when the variable a is still larger than the smallest search step, and the processing of steps 1084 to 1098 is repeated for the new K set at step 1096. Processing proceeds to step 1102 when the variable a has reached the smallest search step or smaller, and the CPU 21 outputs the value set as Kmax as the light exposure amount ratio N, and processing returns to the image processing illustrated in FIG. 18.

Then at step 110 of the image processing illustrated in FIG. 18, the CPU 21 reads the RAW data_S stored in the RAM 22 and inputs this data to the YCbCr conversion circuit 24. The YCbCr conversion circuit 24 converts the input RAW data_S to the YCbCr image_S. The CPU 21 stores the YCbCr image_S converted by the YCbCr conversion circuit 24 in the RAM 22.

Then at step 112, the CPU 21 reads the RAW data_L stored in the RAM 22, and inputs this data to the YCbCr conversion circuit 24. The YCbCr conversion circuit 24 converts the inputs RAW data_L into the YCbCr image_L. The CPU 21 then stores the YCbCr image_L converted by the YCbCr conversion circuit 24 in the RAM 22.

Then at step 114, the CPU 21 reads the YCbCr image_S stored in the RAM 22 and inputs it to the image processing circuit 25. The image processing circuit 25 adjusts the pixel values by respectively multiplying each of the pixel values Y, Cb and Cr of the input YCbCr image by the value of light exposure amount ratio N computed at step 1102 raised to the power $1/\gamma$ ($N^{\wedge}(1/\gamma)$).

Then at step 116, the CPU 21 reads the YCbCr image_L stored in the RAM 22 and inputs it to the image processing circuit 25. The image processing circuit 25 detects the camera shake between the two images based on the N*YCbCr image_S that has been pixel value adjusted at step 114 and the input YCbCr image_L, and computes the camera shake amount.

Then at step 118, the image processing circuit 25 detects subject blur between the two images based on the N*YCbCr image_S and the YCbCr image_L, and generates a subject blur mask.

Then at step 120, the image processing circuit 25 computes the blend ratio for synthesizing together the N*YCbCr image_S and the YCbCr image_L based on the YCbCr image and the subject blur mask generated at step 118. Then the image processing circuit 25 corrects the camera shake between the N*YCbCr image_S and the YCbCr image_L based on the camera shake amount computed at step 116, and synthesizes together the N*YCbCr image_S and the YCbCr image_L based on the calculated blend ratio. The image processing circuit 25 also performs tone mapping processing on the synthesized image to generate a HDR synthesized image.

Then at step 122, the CPU 21 stores the HDR synthesized image generated by the image processing circuit 25 at step 120 in the RAM 22, controls to display the HDR synthesized image on the display section 14, and then ends the image processing.

As explained above, according to the imaging apparatus of the first exemplary embodiment, a histogram of a hypothetical image captured with K times the light exposure amount of the short light exposure time image is estimated as the K-times histogram. Then the light exposure amount ratio between the short light exposure time image and the long light exposure time image is computed based on the degree of similarity in the profiles of the K-times histogram and the long light exposure time image histogram. Doing so thereby enables an accurate light exposure amount ratio to be computed even when the subject moves between the short light exposure time image and the long light exposure time image, or when noise and quantization error occurs.

As a result a reduction in the occurrence of unnatural joins in the synthesized image is enabled, and camera shake detection and subject blur detection performance is raised, thereby enabling deterioration in image quality of the synthesized image to be suppressed.

Moreover, according to the imaging apparatus of the first exemplary embodiment, the output of the image pick-up device is employed when computing the light exposure amount ratio rather than the YCbCr image, and with the RAW data having linear characteristics with respect to incident light levels to the image pick-up device employed. A more accurate light exposure amount ratio can thereby be computed than when the light exposure amount ratio is computed employing the YCbCr image to which non-linear processing has been performed, such as gamma correction.

Moreover, normal image processing processors often include a histogram computation function, thereby enabling the image processing apparatus of the technology disclosed herein to be realized using general purpose hardware, and leading to a reduction in cost.

Second Exemplary Embodiment

Explanation next follows regarding a second exemplary embodiment. Note that the configuration of the imaging apparatus 10 according to the second exemplary embodiment is similar to the configuration of the imaging apparatus 10 according to the first exemplary embodiment and so further explanation thereof is omitted.

Figure 20:
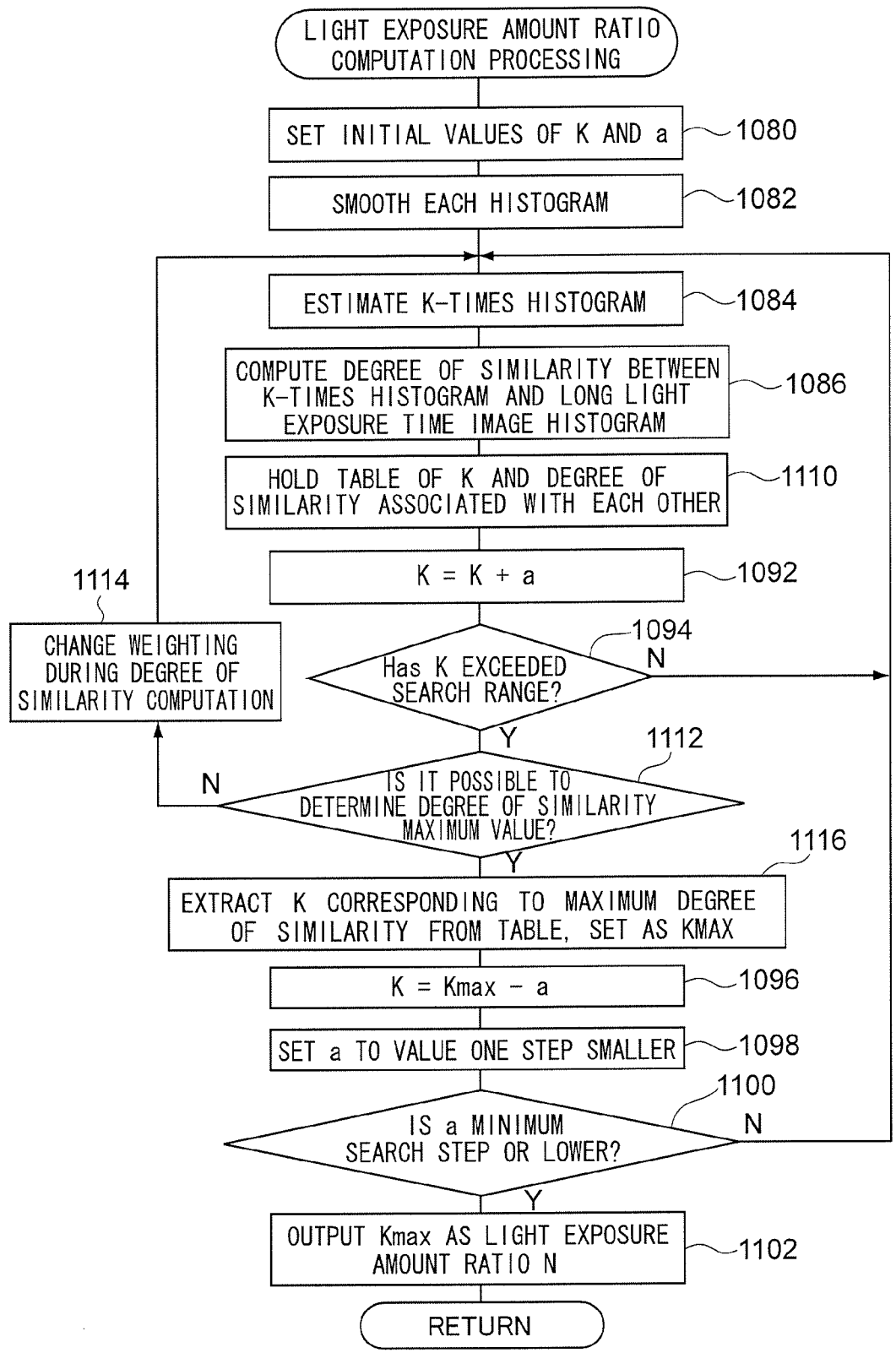
FIG. 20 is a flow chart illustrating light exposure amount ratio computation processing in a second exemplary embodiment.

Work of the imaging apparatus 10 according to the second exemplary embodiment differs from that of the first exemplary embodiment in the light exposure amount ratio computation processing executed by the CPU 21, and so explanation follows regarding the light exposure amount ratio computation processing of the second exemplary embodiment, with reference to FIG. 20. Note that steps of the light exposure amount ratio computation processing of the second exemplary embodiment that are similar to the light exposure amount ratio computation processing in the first exemplary embodiment are allocated the same reference numerals and detailed explanation thereof is omitted.

Through steps 1080 to 1086 of the light exposure amount ratio computation processing illustrated in FIG. 20, the CPU 21 computes the degree of similarity between the profiles of the K-times histogram and the long light exposure time image histogram. The computed degree of similarity may, for example, employ the sum of absolute difference values weighted to give greater emphasis the nearer the pixel values of the histogram are to the central value.

Then at step 1110, the CPU 21 associates the degree of similarity computed at step 1086 with the current value of K in a table held in the RAM 22.

Then at step 1092, the CPU 21 adds a to K to give a new K, and then at step 1094 determines whether or not the variable K has exceeded a predetermined search range. Processing returns to step 1084 when the variable K has exceeded the search range, and the processing of steps 1084 to 1092 are repeated for the new K set at step 1092. Processing proceeds to step 1112 when the variable K has exceeded the search range, the table held at step 1110 is examined, and determination is made as to whether or not it is possible to determine a unique maximum value of the degree of similarity.

For example, sometimes there are plural similar degree of similarities present as the maximum value of the degree of similarity, and sometimes there are cases in which there are plural degree of similarities present that have a difference to the maximum degree of similarity that is within a specific range. The difference in the degree of similarity being within a specific range means, for example when the sum of the absolute difference values is employed as the degree of similarity, that the difference of the degree of similarity is within a range of small difference of about 0 to 1. In such cases it is not possible to accurately determine which K associated with which degree of similarity to select as the Kmax, and there are cases in which an accurate light exposure amount ratio cannot be computed due to selecting the wrong K.

Figure 21:
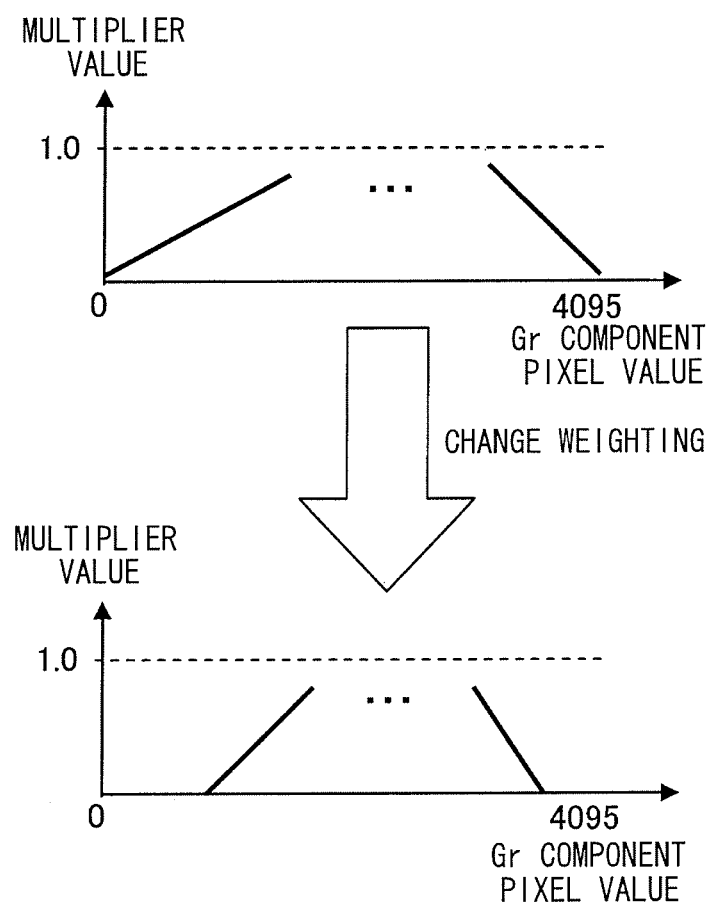
FIG. 21 is a schematic diagram to explain changing weightings.

Thus at step 1112, the maximum value for the degree of similarity is not uniquely determined when there are plural similar degree of similarities as the maximum value of the degree of similarity, and when there are plural degree of similarities present with a difference to the maximum degree of similarity lying within a specific range. Processing accordingly proceeds to step 1114 when the maximum value of the degree of similarity is not determined uniquely, and the CPU 21 changes the weightings employed when computing the degree of similarity at step 1086. Specifically, change is made for example as illustrated in FIG. 21 such that emphasis weighting is placed on the pixel values near to the center values.

At step 1114, when the weightings have changed, the processing returns to step 1084, and the weightings that have been changed at step 1114 are employed while repeating the processing of steps 1084 to 1092. When processing returns to step 1084 via step 1114, processing may then be repeated only for the Ks in the table held at step 1110 that correspond to degrees of similarity within the specific range that includes the maximum degree of similarity.

When the CPU 21 has determined at step 1112 that it is possible to uniquely determine the maximum value of the degree of similarity, processing proceeds to step 1116, and the value of K corresponding to the maximum value of the degree of similarity is extracted from the table and set as the Kmax.

In the following steps 1096 to 1102, the CPU 21 performs similar processing to the light exposure amount ratio computation processing of the first exemplary embodiment, outputs the light exposure amount ratio N, and returns to the image processing illustrated in FIG. 18.

As explained above, according to the imaging apparatus of the second exemplary embodiment, when the maximum value of the degree of similarity of the histogram profiles cannot be determined uniquely, the weighting in the degree of similarity computation is changed to given more emphasis to weighting of the pixel values in the vicinity of the central value, and the degree of similarity is re-computed. This thereby enables the light exposure amount ratio to be computed more accurately.

Third Exemplary Embodiment

Figure 22:
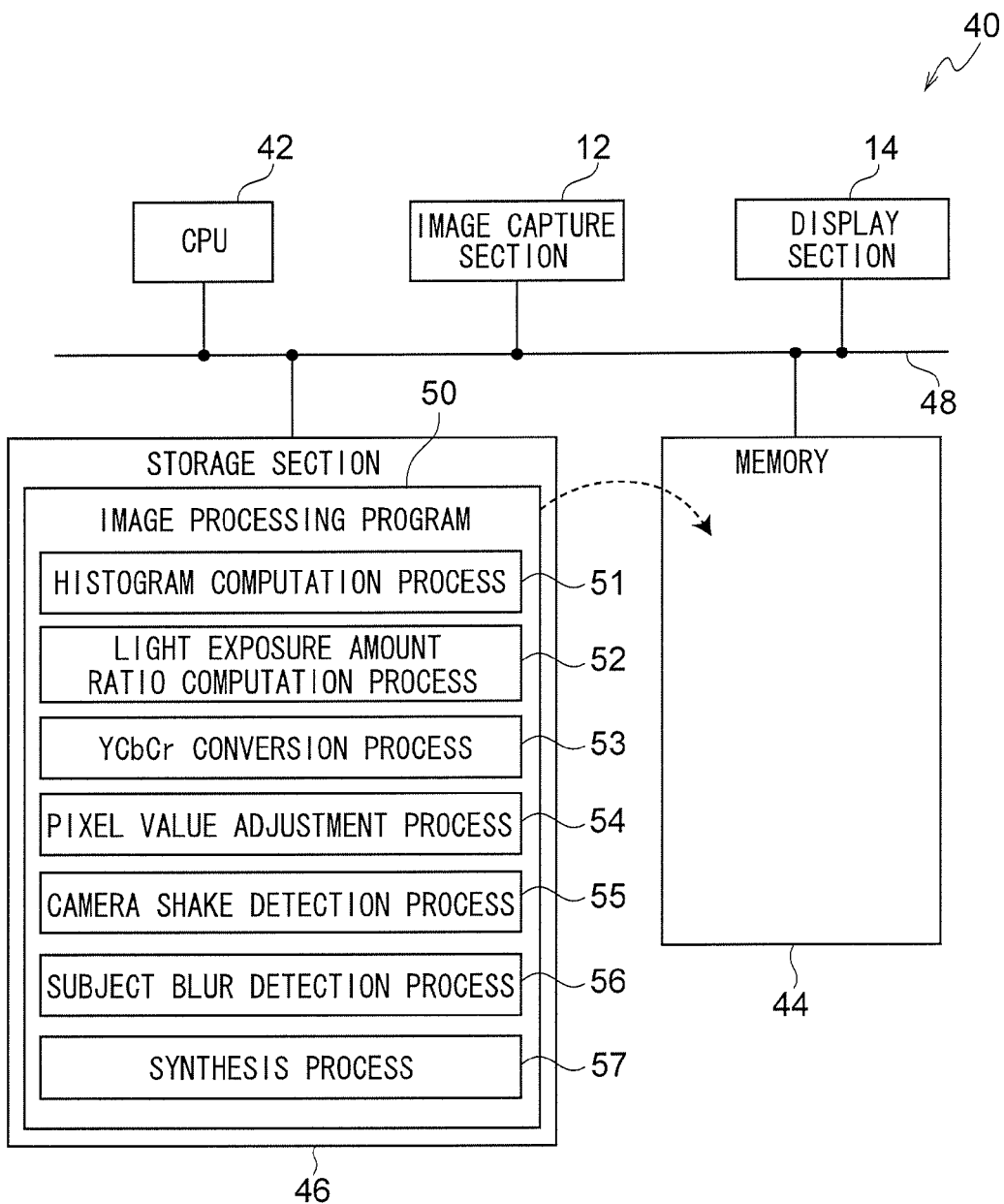
FIG. 22 is a schematic block diagram illustrating an example of a computer that functions as an image processing section of an imaging apparatus according to a third exemplary embodiment.

Explanation next follows regarding the third exemplary embodiment. In the first and the second exemplary embodiments explanation has been given of cases in which the image processing section 16 is an image processing processor. An image processing section 16 of an imaging apparatus 10 the third exemplary embodiment may for example be implemented by a computer 40 as illustrated in FIG. 22. The computer 40 includes a CPU 42, a memory 44 and a nonvolatile storage section 46. The CPU 42, the memory 44 and the storage section 46 are connected to each other through a bus 48. An image capture section 12 and a display section 14 are connected to the computer 40.

The storage section 46 may be implemented for example by a Hard Disk Drive (HDD) or a flash memory. The storage section 46 serving as a recording medium is stored with an image processing program 50 for causing the computer 40 to function as the image processing section 16. The CPU 42 reads the image processing program 50 from the storage section 46, expands the image processing program 50 into the memory 44, and sequentially executes the processes of the image processing program 50.

The image processing program 50 includes a histogram computation process 51, a light exposure amount ratio computation process 52, a YCbCr conversion process 53, a pixel value adjustment process 54, a camera shake detection process 55, a subject blur detection process 56, and a synthesis process 57.

The CPU 42 operates as the histogram computation section 31 illustrated in FIG. 2 by executing the histogram computation process 51. The CPU 42 operates as the light exposure amount ratio computation section 32 illustrated in FIG. 2 by executing the light exposure amount ratio computation process 52. The CPU 42 operates as the YCbCr conversion section 33 illustrated in FIG. 2 by executing the YCbCr conversion process 53. The CPU 42 operates as the pixel value adjustment section 34 illustrated in FIG. 2 by executing the pixel value adjustment process 54. The CPU 42 operates as the camera shake detection section 35 illustrated in FIG. 2 by executing the camera shake detection process 55. The CPU 42 operates as the subject blur detection section 36 illustrated in FIG. 2 by executing the subject blur detection process 56. The CPU 42 operates as the synthesis section 37 illustrated in FIG. 2 by executing the synthesis process 57. The computer 40 executing the image processing program 50 accordingly functions as the image processing section 16.

As explained above, according to the imaging apparatus of the third exemplary embodiment, similar advantageous effects to those of the imaging apparatus according to the first or the second exemplary embodiment are enabled by executing the program.

Note that explanation has been given of a mode in which the image processing program 50 that is an example of an image processing program of technology disclosed herein is pre-stored (installed) on the storage section 46. However, the image processing program of technology disclosed herein may be provided in a format recorded on a recording medium such as a CD-ROM or a DVD-ROM.

Moreover, in the first and the second exemplary embodiments, explanation has been given of cases in which the image processing processor includes dedicated circuits of a histogram computation circuit, a YCbCr conversion circuit, and an image processing circuit, and processing other than the light exposure amount ratio computation processing is performed on these dedicated circuits, however there is no limitation thereto. For example, with respect to the light exposure amount ratio computation processing, a dedicated circuit may also be provided for executing the light exposure amount ratio computation processing. Moreover, one or more types of processing out of the histogram computation processing, the conversion processing to the YCbCr image, the processing to adjust the pixel values, the processing to detect camera shake or the processing to detect subject blur, or the synthesis processing maybe executed with the performed in the respective dedicated circuits in the first and second exemplary embodiment may be executed by the CPU.

Moreover, although in each of the exemplary embodiments when weighting is applied in degree of similarity computation of the histograms, in FIG. 9 and FIG. 21 examples have been given of cases in which weighting is applied so as to make changes linearly to pixel values, there is no limitation thereto. Weightings may be applied as weightings to change as curved lines with respect to the pixel values.

Moreover, although explanation has been given in each of the exemplary embodiments of cases in which the K-times histogram is estimated from the short light exposure time image, there is no limitation thereto. A histogram may be estimated as the K-times histogram of a hypothetical image captured at K times the light exposure amount of the light exposure amount of the long light exposure time image. In such cases the value of K is set from 0 to 1. The number of pixels of each of the pixel values of the long light exposure time image histogram may be combined and allocated to corresponding pixel values to the histogram with K times the pixel values. For example, when K=0.5, the sum of the number of pixels for pixel value 2n (n=0, 1, 2, and so on) of the long light exposure time image and the number of pixels for pixel value (2n+1) of the long light exposure time image may be set as the number of pixels of the pixel value n in the K-times histogram.

Moreover, each of the above exemplary embodiments, explanation has been given regarding cases in which the two images of the short light exposure time image and the long light exposure time image are synthesized together. However the technology disclosed herein may also be applied to synthesizing together 3 or more images, with an intermediate light exposure time image added with a light exposure time between those of the short light exposure time image and the long light exposure time image. In such cases, similarly to in the above exemplary embodiments, a K-times light exposure time histogram is estimated from the histogram of an intermediate light exposure time image, enabling a light exposure amount ratio N' between the intermediate light exposure time image and the long light exposure time image to be computed for the K when the degree of similarity to the long light exposure time image histogram is at a maximum. Pixel value adjustment of the short light exposure time image is then performed based on the light exposure amount ratio N, and pixel value adjustment of the intermediate light exposure time image is performed based on the light exposure amount ratio N'. After performing pixel value adjustment in such a manner synthesis processing of the 3 images may then be performed.

Moreover, in each of the above exemplary embodiments, explanation has been given of cases in which plural images are captured by with different light exposure amounts by setting different light exposure times, however configuration may be made such that plural images are captured by making different light exposure amounts by for example adjusting the aperture, or by the presence or absence of lighting.

An aspect of the technology disclosed herein has the advantageous effect of enabling a light exposure amount ratio between plural images to be accurately computed even when there is subject movement between the plural images, or noise or quantization errors occur.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus comprising:
   a histogram computation section that, for a plurality of images with different light exposure amounts captured by an image capture section, computes for each of the images a histogram expressing the number of pixels of each pixel value in the pixels contained in each of the respective plurality of images;
   a light exposure amount ratio computation section that, based on a degree of similarity between a profile of a first histogram computed from a first image out of the plurality of images and a profile of a second histogram computed from a second image out of the plurality of images, computes, as a light exposure amount ratio, a ratio between a light exposure amount for the first image and a light exposure amount for the second image;
   a pixel value adjustment section that adjusts the pixel values of pixels contained in one image out of the first image or the second image based on the light exposure amount ratio computed by the light exposure amount ratio computation section; and
   a synthesis section that synthesizes together the one image out of the first image or the second image after pixel value adjustment by the pixel value adjustment section with the other image out of the first image or the second image after pixel value adjustment by the pixel value adjustment section.

2. The image processing apparatus of claim 1, wherein the light exposure amount ratio computation section derives a degree of similarity between a specific multiple of the number of pixels of each of the pixel values of the first histogram and a profile of the second histogram.

3. The image processing apparatus of claim 1, wherein the light exposure amount ratio computation section computes, as the degree of similarity, a value that is a total pixel value segment sum of values for each pixel value using absolute difference values or squares of differences between the number of pixels of each of the pixel values in the first histogram and the number of pixels of each of the corresponding pixel values in the second histogram.

4. The image processing apparatus of claim 3, wherein, as the values, the light exposure amount ratio computation section takes values computed by multiplying absolute difference values or squares of differences, between the number of pixels of each of the pixel values in the first histogram and the number of pixels of each of the corresponding pixel values in the second histogram, by weighting values that increase as the distance from a central value of the pixel values in the histogram decreases.

5. The image processing apparatus of claim 4, wherein the light exposure amount ratio computation section makes the weighting values larger and re-derives the degree of similarity when there are a plurality of degrees of similarity present with a difference to a maximum value of the degree of similarity within a specific range.

6. The image processing apparatus of claim 1, wherein, as the pixel values for computing the histograms, the histogram computation section uses pixel values expressed by a signal that has been output from the image capture section and has been digitally converted.

7. An imaging apparatus comprising:
   an image capture section;
   a histogram computation section that, for a plurality of images of different light exposure amounts captured by the image capture section, computes for each of the images a histogram expressing the number of pixels of each pixel value in the pixels contained in each of the respective plurality of images;
   a light exposure amount ratio computation section that, based on a degree of similarity between a profile of a first histogram computed from a first image out of the plurality of images and a profile of a second histogram computed from a second image out of the plurality of images, computes, as a light exposure amount ratio, a ratio between a light exposure amount for the first image and a light exposure amount for the second image;
   a pixel value adjustment section that adjusts the pixel values of pixels contained in one image out of the first image or the second image based on the light exposure amount ratio computed by the light exposure amount ratio computation section;
   a synthesis section that synthesizes together the one image out of the first image or the second image after pixel value adjustment by the pixel value adjustment section with the other image out of the first image or the second image after pixel value adjustment by the pixel value adjustment section; and
   a display section that displays an image that has been synthesized together by the synthesis section.

8. An image processing method executed by a computer, the method comprising:
   (a) for each of a plurality of images of different light exposure amounts captured by an image capture section, computing a histogram expressing the number of pixels of each pixel value in the pixels contained in each of the respective plurality of images;
   (b) based on a degree of similarity between a profile of a first histogram computed from a first image out of the plurality of images and a profile of a second histogram computed from a second image out of the plurality of images, computing, as a light exposure amount ratio, a ratio between a light exposure amount for the first image and a light exposure amount for the second image;
   (c) adjusting the pixel values of pixels contained in one image out of the first image or the second image based on the computed light exposure amount ratio; and
   (d) synthesizing together the one image out of the first image or the second image after pixel value adjustment with the other image out of the first image or the second image after pixel value adjustment.

9. The image processing method of claim 8, the method comprising, in (b), deriving a degree of similarity between a specific multiple of the number of pixels of each of the pixel values of the first histogram and a profile of the second histogram.

10. The image processing method of claim 8, the method comprising, in (b), computing, as the degree of similarity, a value that is a total pixel value segment sum of values for each pixel value using absolute difference values or squares of differences between the number of pixels of each of the pixel values in the first histogram and the number of pixels of each of the corresponding pixel values in the second histogram.

11. The image processing method of claim 10, the method comprising, in (b), as the values, taking values computed by multiplying absolute difference values or squares of differences, between the number of pixels of each of the pixel values in the first histogram and the number of pixels of each of the corresponding pixel values in the second histogram, by weighting values that increase as the distance from a central value of the pixel values in the histogram decreases.

12. The image processing method of claim 11, the method comprising, in (b), making the weighting values larger and re-deriving the degree of similarity when there are a plurality of degrees of similarity present with a difference to a maximum value of the degree of similarity within a specific range.

13. The image processing method of claim 8, the method comprising, in (a), using, as the pixel values for computing the histograms, pixel values expressed by a signal that has been output from the image capture section and digitally converted.

14. A non-transitory computer-readable storage medium that stores an image processing program that causes a computer to execute processing, the processing comprising:
   (a) for a plurality of images of different light exposure amounts captured by an image capture section, computing, for each of the images, a histogram expressing the number of pixels of each pixel value in the pixels contained in each of the respective plurality of images;
   (b) based on a degree of similarity between a profile of a first histogram computed from a first image out of the plurality of images and a profile of a second histogram computed from a second image out of the plurality of images, computing, as a light exposure amount ratio, a ratio between a light exposure amount for the first image and a light exposure amount for the second image;
   (c) adjusting the pixel values of pixels contained in one image out of the first image or the second image based on the computed light exposure amount ratio; and
   (d) synthesizing together the one image out of the first image or the second image after pixel value adjustment with the other image out of the first image or the second image after pixel value adjustment.

15. The non-transitory computer-readable storage medium that stores the image processing program of claim 14, the processing comprising, in (b), deriving a degree of similarity between a specific multiple of the number of pixels of each of the pixel values of the first histogram and a profile of the second histogram.

16. The non-transitory computer-readable storage medium that stores the image processing program of claim 14, the processing comprising, in (b), computing, as the degree of similarity, a value that is a total pixel value segment sum of values for each pixel value using absolute difference values or squares of differences between the number of pixels of each of the pixel values in the first histogram and the number of pixels of each of the corresponding pixel values in the second histogram.

17. The non-transitory computer-readable storage medium that stores the image processing program of claim 16, the processing comprising, in (b), as the values, taking values computed by multiplying absolute difference values or squares of differences, between the number of pixels of each of the pixel values in the first histogram and the number of pixels of each of the corresponding pixel values in the second histogram, by weighting values that increase as the distance from a central value of the pixel values in the histogram decreases.

18. The non-transitory computer-readable storage medium that stores the image processing program of claim 17, the processing comprising, in (b), making the weighting values larger and re-deriving the degree of similarity when there are a plurality of degrees of similarity present with a difference to a maximum value of the degree of similarity within a specific range.

19. The non-transitory computer-readable storage medium that stores the image processing program of claim 14, the processing comprising, in (a), using, as the pixel values for computing the histograms, pixel values expressed by a signal that has been output from the image capture section and digitally converted.

* * * * *